(12) United States Patent
Nada

(10) Patent No.: US 6,879,902 B2
(45) Date of Patent: Apr. 12, 2005

(54) ACCELERATOR OPENING SETTING APPARATUS, METHOD THEREOF AND MOTOR VEHICLE EQUIPPED WITH THE APPARATUS

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 10/377,622

(22) Filed: Mar. 4, 2003

(65) Prior Publication Data

US 2003/0182046 A1 Sep. 25, 2003

(30) Foreign Application Priority Data

Mar. 19, 2002 (JP) .................................. 2002-076459

(51) Int. Cl.⁷ .............................. G06F 7/00; B60T 8/32
(52) U.S. Cl. .................... 701/93; 701/110; 123/399; 123/339.14; 123/339.23; 180/170
(58) Field of Search .......................... 701/70, 93, 96, 701/94, 53, 110; 123/339.1, 339.19, 339.23, 363, 400, 399, 349, 350, 352, 361; 180/171, 170, 178, 179

(56) References Cited

U.S. PATENT DOCUMENTS

| | | | |
|---|---|---|---|
| 4,787,353 A | 11/1988 | Ishikawa et al. | 123/399 |
| 5,445,125 A | 8/1995 | Allen | 123/399 |
| 5,477,825 A | 12/1995 | Hattori et al. | 123/399 |
| 5,845,726 A | * 12/1998 | Kikkawa et al. | 180/178 |
| 6,138,071 A | * 10/2000 | Sekine et al. | 701/93 |
| 6,236,929 B1 | * 5/2001 | Sen et al. | 701/93 |
| 6,332,450 B1 | 12/2001 | Muto et al. | 123/352 |
| 2001/0016538 A1 | * 8/2001 | Saito et al. | 477/111 |
| 2001/0039940 A1 | 11/2001 | Kuretake | 123/399 |

FOREIGN PATENT DOCUMENTS

| | | |
|---|---|---|
| JP | U 64-25435 | 2/1989 |
| JP | A 9-14021 | 1/1997 |
| JP | A 9-42032 | 2/1997 |
| JP | A 2000-345882 | 12/2000 |
| WO | WO 01/02210 A1 | 1/2001 |

* cited by examiner

Primary Examiner—Jacques H. Louis-Jacques
(74) Attorney, Agent, or Firm—Oliff & Berridge, PLC

(57) ABSTRACT

When the vehicle speed is within a range equal to or greater than a threshold value in which the vehicle is often cruised, a cruising accelerator opening is set as an accelerator opening needed to cruise the vehicle at the vehicle speed, and a cruise-purposed convergence opening corresponding to the amount of depression of an accelerator pedal requested of a driver is set at the time of cruise. An offset opening is calculated as a deviation between the set cruising accelerator opening and the set cruise-purposed convergence opening. Then, the accelerator opening for calculating a power needed to run the vehicle is set at the sum of the offset opening and an pedal opening corresponding to the amount of depression of the accelerator pedal.

36 Claims, 10 Drawing Sheets

ACCELERATOR OPENING SETTING APPARATUS, METHOD THEREOF AND MOTOR VEHICLE EQUIPPED WITH THE APPARATUS

INCORPORATION BY REFERENCE

The disclosure of Japanese Patent Application No. 2002-76459 filed on Mar. 19, 2002 including the specification, drawings and abstract is incorporated herein by reference in its entirety.

BACKGROUND OF THE INVENTION

1. Field of Invention

The invention relates to an accelerator opening setting apparatus, a method thereof and a motor vehicle equipped with the apparatus. More particularly, the invention relates to an automotive accelerator opening setting apparatus for setting the degree of opening of an accelerator in accordance with the amount of operation of an accelerator pedal, and a motor vehicle equipped with the apparatus.

2. Description of Related Art

In a motor vehicle of the aforementioned type, a throttle valve of an internal combustion engine is electronically controlled so as to achieve a degree of throttle opening corresponding to a driver's request and to the state of operation of the internal combustion engine (disclosed in, for example, Japanese Patent Application Laid-Open Publication No. 9-42032). In this motor vehicle, a target degree of throttle opening is set on the basis of a driver's operation of an accelerator, and the throttle valve is driven and controlled by an electric motor so as to achieve the target degree of throttle opening. If the fluctuation in the amount of an accelerator operation becomes small, it is determined that a steady engine operation is reached, and the control gain is reduced so as to facilitate the steady engine operation.

However, in this type of motor vehicle, the accelerator needs to be frequently operated in order to maintain a cruising speed of the vehicle after an accelerating or decelerating operation. When the amount of the accelerator operation is greatly changed for acceleration or deceleration, the degree of opening of the throttle valve is controlled to an increased or decreased degree corresponding to the amount of the accelerator operation. To establish a cruising run from this state, it is necessary to operate the accelerator so as to set an amount of the accelerator operation suitable to the cruise. However, it is not easy to immediately set the amount of an accelerator operation, and therefore the accelerator needs to be frequently operated. The control gain is set small at the time of small fluctuations in the amount of the accelerator operation. However, when a cruise is intended following an accelerating or decelerating state, the amount of accelerator operation is great, so that the control gain is not set small. In that case, therefore, frequent accelerator operations are needed.

SUMMARY OF THE INVENTION

The invention has been accomplished in view of the aforementioned circumstances. The invention thus provides an accelerator opening setting apparatus that lightens the burden on a vehicle driver for a cruise. The invention also provides an accelerator opening setting apparatus that allows an easy and steady transition from an accelerating or decelerating operation to a cruise. The invention further provides an accelerator opening setting apparatus that improves the operability of the vehicle. The invention further provides a motor vehicle that is capable of a steady transition from an accelerating or decelerating operation to a cruise, and that lightens the burden on a driver at the time of a cruise and achieves improved operability.

In order to achieve at least one of the foregoing, the accelerator opening setting apparatus of a first aspect of the invention is an accelerator opening setting apparatus of a motor vehicle for setting an accelerator opening in accordance with an amount of operation of an accelerator pedal. The apparatus includes a first detector that detects a vehicle speed; a second detector that detects an operational state of the accelerator pedal; a first storage that stores an accelerator opening corresponding to a vehicle speed at which the vehicle cruises in a predetermined condition as a cruise-purpose accelerator opening; a second storage that stores an amount of operation of the accelerator pedal occurring at a time of a cruise corresponding to the vehicle speed as a cruising operation amount; and a controller sets the cruise-purpose accelerator opening corresponding to the vehicle speed detected by the first detector among the stored cruise-purpose accelerator openings as the accelerator opening, if the amount of operation of the accelerator pedal detected by the second detector equals a cruising operation amount corresponding to the detected vehicle speed, among stored cruising operation amounts.

In the accelerator opening setting apparatus of the first aspect of the invention, when the amount of operation of the accelerator pedal detected by the second detector equals the cruising operation amount corresponding to the vehicle speed, the cruise-purpose accelerator opening, as the accelerator opening that causes the vehicle in the predetermined condition to cruise at that vehicle speed, is set as an accelerator opening. Therefore, if the cruising operation amount is set at a relatively small amount of operation, the vehicle can be cruised with a relatively small amount of operation of the accelerator. As a result, the driver's burden at the time of cruising can be lightened in comparison with a case where an amount of operation of the accelerator pedal corresponding to the cruising operation amount is needed. The "vehicle in the predetermined condition" means a vehicle on which the state of running road surface, the number of occupants and the state of load carried are set, for example, a vehicle carrying one occupant and running on a flat road, or the like.

In the accelerator opening setting apparatus of the first aspect of the invention, the cruise-purpose accelerator opening may be set stepwise with respect to the vehicle speed. Therefore, even if the vehicle speed slightly changes within a given step of the aforementioned setting, the apparatus prevents the accelerator opening from being changed without a change in the amount of operation of the accelerator pedal.

In the accelerator opening setting apparatus of the first aspect of the invention in which the cruise-purpose accelerator opening is set stepwise with respect to the vehicle speed, the cruise-purpose accelerator opening may be set so as to equal an accelerator opening that causes the vehicle in the predetermined condition to cruise at a vehicle speed that appears substantially in the middle of each step. Therefore, with the accelerator opening set at the cruise-purpose accelerator opening, the vehicle cruises at the vehicle speed that appears substantially in the middle of each step. Hence, the deviation between the cruise-purpose accelerator opening of each step and the accelerator opening needed to cruise the vehicle at a vehicle speed that is apart from the middle of the step can be reduced.

Furthermore, in the accelerator opening setting apparatus of the first aspect of the invention in which the cruise-purpose accelerator opening is set stepwise with respect to the vehicle speed, the cruise-purpose accelerator opening may be set with a hysteresis with respect to the vehicle speed. Therefore, it becomes possible to prevent the cruise-purpose accelerator opening from being frequently changed in association with slight changes in the vehicle speed.

Still further, in the accelerator opening setting apparatus of the first aspect of the invention in which the cruise-purpose accelerator opening is set stepwise with respect to the vehicle speed, the cruise-purpose accelerator opening may be set so that there is a stepped portion where the cruise-purpose accelerator opening changes linearly with respect to the vehicle speed. This setting curbs sharply stepped changes in the cruise-purpose accelerator opening in response to changes in the vehicle speed.

In the accelerator opening setting apparatus of the first aspect of the invention, the cruise-purpose accelerator opening may be set when the vehicle speed is at least a predetermined vehicle speed. Therefore, the driver's burden at the time of cruising at or above the predetermined vehicle speed can be reduced. In this case, when the vehicle speed is below the predetermined speed, the amount of operation of the accelerator pedal can be directly reflected in the accelerator opening.

In the accelerator opening setting apparatus of the first aspect of the invention, the controller may be a site that regards the amount of operation of the accelerator pedal as the cruising operation amount corresponding to the vehicle speed in setting the accelerator opening if it is detected by the second detector that the accelerator pedal is operated to an amount of operation that is greater than the cruising operation amount corresponding to the vehicle speed by at least a predetermined amount, and then is returned to a side of the cruising operation amount corresponding to the vehicle speed so that the accelerator pedal has an amount of operation that is within a predetermined range from the cruising operation amount corresponding to the vehicle speed. Therefore, as long as the amount of operation of the accelerator pedal is within a predetermined range of operation amount although the amount of operation of the accelerator pedal slightly deviates from the cruising operation amount, the cruise-purpose accelerator opening is set as an accelerator opening. Hence, transition from an accelerating state to a cruise can be achieved more easily and stably.

The accelerator opening setting apparatus of the first aspect of the invention may further include a controller that sets a deviation between a pedal-corresponding opening corresponding to the cruising operation amount corresponding to the vehicle speed, among pedal-corresponding openings corresponding to the amount of operation of the accelerator pedal, as an offset opening, and sets the accelerator opening at a sum of the pedal-corresponding opening corresponding to the amount of operation of the accelerator pedal detected by the second detector and the set offset opening. Therefore, it becomes possible to set the accelerator opening based on the pedal-corresponding opening and the offset opening corresponding to the vehicle speed.

In the accelerator opening setting apparatus of the first aspect of the invention in which the accelerator opening is set through the use of the offset opening corresponding to the vehicle speed, the controller may be a site that sets the pedal-corresponding opening corresponding to the amount of the operation of the accelerator pedal detected by the second detector as an accelerator opening if the vehicle speed detected by the first detector is less than a predetermined vehicle speed. Therefore, it becomes possible to set the amount of operation of the accelerator pedal directly as an accelerator opening if the vehicle speed is less than the predetermined speed.

Furthermore, in the accelerator opening setting apparatus of the first aspect of the invention in which the accelerator opening is set through the use of the offset opening corresponding to the vehicle speed, the controller may be a site as described below. That is, if the second detector detects a fixation of the amount of operation of the accelerator pedal, the site sets the accelerator opening by using the cruising operation amount occurring when the fixation of the amount of operation of the accelerator pedal is detected, regardless of the vehicle speed detected by the first detector. Therefore, if the amount of operation of the accelerator pedal is fixed, the cruising operation amount is not changed despite a change in the vehicle speed. Hence, the accelerator opening is prevented from changing without a change in the amount of operation of the accelerator pedal. In this accelerator opening setting apparatus of the first aspect of the invention, the controller may be a site as follows. That is, if the second detector detects a fixation of the amount of operation of the accelerator pedal, and then detects a change in the amount of operation of the accelerator pedal, the site sets an accelerator opening by using a cruise-purpose accelerator opening that is changed from the cruise-purpose accelerator opening occurring when the fixation of the amount of operation of the accelerator pedal is detected, toward the cruise-purpose accelerator opening corresponding to the vehicle speed detected by the first detector, at a predetermined rate of change per time. Therefore, it becomes possible to prevent the accelerator opening from being sharply changed immediately after the fixation of the amount of operation of the accelerator pedal ends.

In the accelerator opening setting apparatus of the first aspect in which the accelerator opening is set through the use of the offset opening corresponding to the vehicle speed, the controller may be a site as described below. That is, if the pedal-corresponding opening corresponding to the amount of operation of the accelerator pedal detected by the second detector is at least a predetermined opening, the site sets the pedal-corresponding opening as an accelerator opening. Therefore, if the pedal-corresponding opening is greater than or equal to the predetermined opening, the amount of operation of the accelerator pedal can be set directly as an accelerator opening. Hence, the driver's operation on the accelerator pedal can be faithfully reflected. In the accelerator opening setting apparatus of the first aspect, the predetermined opening may be set at an opening that is greater than a cruise-purpose accelerator opening corresponding to the vehicle speed detected by the first detector.

Furthermore, in the accelerator opening setting apparatus of the first aspect, the controller may be a site as described below. That is, if the pedal-corresponding opening corresponding to the amount of operation of the accelerator pedal detected by the second detector is within a predetermined range of opening that is smaller than the predetermined opening, the site sets the accelerator opening by adjusting the offset opening so that the offset opening corresponding to the vehicle speed decreases with increases in the pedal-corresponding opening. Therefore, it becomes possible to achieve smooth transition between the accelerator opening set on the basis of the offset opening and the pedal-corresponding opening, and the accelerator opening set on the basis of the pedal-corresponding opening.

In the accelerator opening setting apparatus of the first aspect in which the accelerator opening is set through the use of the offset opening corresponding to the vehicle speed, the apparatus may further include a third detector that detects a steering angle, wherein the controller is a site that sets the accelerator opening by correcting the offset opening corresponding to the vehicle speed on a basis of the steering angle detected by the third detector. Therefore, it becomes possible to set the accelerator opening by using the offset opening corrected in accordance with the steering angle. In the accelerator opening setting apparatus of the first aspect, the controller may be a site that sets the accelerator opening by correcting the offset opening with a tendency that the offset opening decreases with increases in the detected steering angle. Therefore, due to the correction tendency that the corrected offset opening decreases with increases in the steering angle, it becomes possible to set the accelerator opening that reflects the amount of operation of the accelerator pedal more directly as the detected steering angle increases.

The accelerator opening setting apparatus of the first aspect may further include a fourth detector that detects a road surface slope, wherein the controller is a site that sets the accelerator opening based on the road surface slope detected by the fourth detector. Therefore, the apparatus becomes able to set the accelerator opening in accordance with the road surface slope. In this accelerator opening setting apparatus of the first aspect, the controller may be a site that sets the accelerator opening with a tendency that the accelerator opening increases with increases in the road surface slope detected as upward slope. Due to the setting tendency that the set accelerator opening increases with increases in the road surface slope as upward slope, it becomes possible to set the accelerator opening in accordance with the road surface slope without a need for a great amount of operation of the accelerator pedal. Furthermore, in the accelerator opening setting apparatus of the first aspect in which the accelerator opening is set on the basis of the road surface slope, the controller may be a site that sets the accelerator opening so that the vehicle runs at a substantially fixed acceleration for a given amount of operation of the accelerator pedal, regardless of the road surface slope. Therefore, it becomes possible to run the vehicle at a substantially fixed acceleration in response to a given amount of operation of the accelerator pedal regardless of the road surface slope.

The accelerator opening setting apparatus of the first aspect may further include a fifth detector that detects a vehicle weight, wherein the controller is a site that sets the accelerator opening based on the vehicle weight detected by the fifth detector. Therefore, the accelerator opening can be set in accordance with the vehicle weight. In this accelerator opening setting apparatus of the first aspect, the controller may be a site that sets the accelerator opening with a tendency that the accelerator opening increases with increases in the vehicle weight detected. Due to the setting tendency that the set accelerator opening increases with increases in the vehicle weight, it becomes possible to set the accelerator opening in accordance with the vehicle weight without a need for a great amount of operation of the accelerator pedal. In the accelerator opening setting apparatus of the first aspect in which the accelerator opening is set on the basis of the vehicle weight, the controller may be a site that sets the accelerator opening so that the vehicle runs at a substantially fixed acceleration for a given amount of operation of the accelerator pedal, regardless of the vehicle weight. Therefore, it becomes possible to run the vehicle at a substantially fixed acceleration in response to a given amount of operation of the accelerator pedal regardless of the vehicle weight.

The accelerator opening setting apparatus in accordance with a second aspect of the invention is an accelerator opening setting apparatus of a motor vehicle for setting an accelerator opening in accordance with an amount of operation of an accelerator pedal. The apparatus includes a first detector that detects a vehicle speed; a second detector that detects an operational state of the accelerator pedal; a first storage that stores an offset opening corresponding to the vehicle speed; a controller that sets an accelerator opening based on the operational state of the accelerator pedal detected by the second detector and the offset opening corresponding to the vehicle speed detected by the first detector among stored offset openings.

The accelerator opening setting apparatus of the second aspect of the invention sets the accelerator opening based on the state of operation of the accelerator pedal and the offset opening corresponding to the vehicle speed, and is therefore able to operate the vehicle with a relatively small amount of operation of the accelerator pedal. Since the vehicle can be cruised with a relatively small amount of operation of the accelerator pedal, the driver's burden at the time of cruising can be lightened.

In the accelerator opening setting apparatus of the second aspect, the controller may be a site that sets the accelerator opening at a sum of the offset opening and a pedal-corresponding opening corresponding to the amount of operation of the accelerator pedal detected by the second detector.

Furthermore, in the accelerator opening setting apparatus of the second aspect, the offset opening may be set stepwise with respect to the vehicle speed. Therefore, even if the vehicle speed slightly changes within a given step, the accelerator opening is prevented from being changed without a change in the amount of operation of the accelerator pedal. In this accelerator opening setting apparatus of the second aspect of the invention, the offset opening may be set with a hysteresis with respect to the vehicle speed. This manner of setting will prevent the cruise-purpose accelerator opening from being frequently changed in association with slight changes in the vehicle speed.

The motor vehicle of the invention includes the above-described accelerator opening setting apparatus of the first or second aspect, and runs on a power corresponding to an accelerator opening set by the accelerator opening setting apparatus.

According to the motor vehicle of the invention, since the above-described accelerator opening setting apparatus of the first or second aspect is installed, the motor vehicle achieves various advantages, including the advantages achieved by the accelerator opening setting apparatus of the first aspect, for example, the advantage of allowing cruise of the vehicle with a relatively small amount of operation of the accelerator pedal provided that the cruising operation amount is set at a relatively small amount, the advantage of reducing the driver's burden at the time of cruising in comparison with a case where the amount of operation of the accelerator pedal corresponding to the cruise-purpose accelerator opening is needed, etc., and the advantages achieved by the accelerator opening setting apparatus of the second aspect, for example, the advantage of allowing operation of the vehicle with a small amount of operation of the accelerator pedal, the advantage of reducing the driver's burden at the time of cruising due to the ability to cruise the vehicle with a small amount of operation of the accelerator pedal, etc.

The motor vehicle of the invention may further include an internal combustion engine; an electric motor capable of inputting and outputting power to a drive shaft connected to an axle;, and a power transfer portion that transfers power from an output shaft of the internal combustion engine to the drive shaft with input or output of power based on an electrical energy, wherein the controller controls the internal combustion engine, the electric motor and the power transfer portion so that a power corresponding to the accelerator opening set by the accelerator opening setting apparatus is output to the drive shaft.

In the motor vehicle of the invention equipped with the power transfer portion, the power transfer portion may have a pair-rotor electric motor which has a first rotor connected to the output shaft of the internal combustion engine, and a second rotor connected to the drive shaft and being rotatable relative to the first rotor, and which is able to input and output power based on the electrical energy on a basis of an electromagnetic effect of the first rotor and the second rotor. Furthermore, in the motor vehicle of the invention equipped with the power transfer portion, the power transfer portion may have a 3-shaft power input/output portion which is connected to three shafts, that is, the output shaft of the internal combustion engine, the drive shaft and a rotating shaft, which inputs or outputs a power corresponding to a power input or output with respect to two of the three shafts, with respect to another shaft of the three shaft, and may also have a rotating shaft-purpose electric motor capable of inputting and outputting power with respect to the rotating shaft.

It should be noted that in order to achieve some of the aforementioned objects, the applicant has already proposed a technology designed to realize the steady running of a vehicle without frequent accelerator operations by switching from a control of achieving a target throttle opening corresponding to the amount of accelerator operation occurring prior to the time of intention to switch to a steady run to a control of achieving a throttle opening that realizes a steady request torque (Japanese Patent Application No. 11-159396).

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

Figure 1:
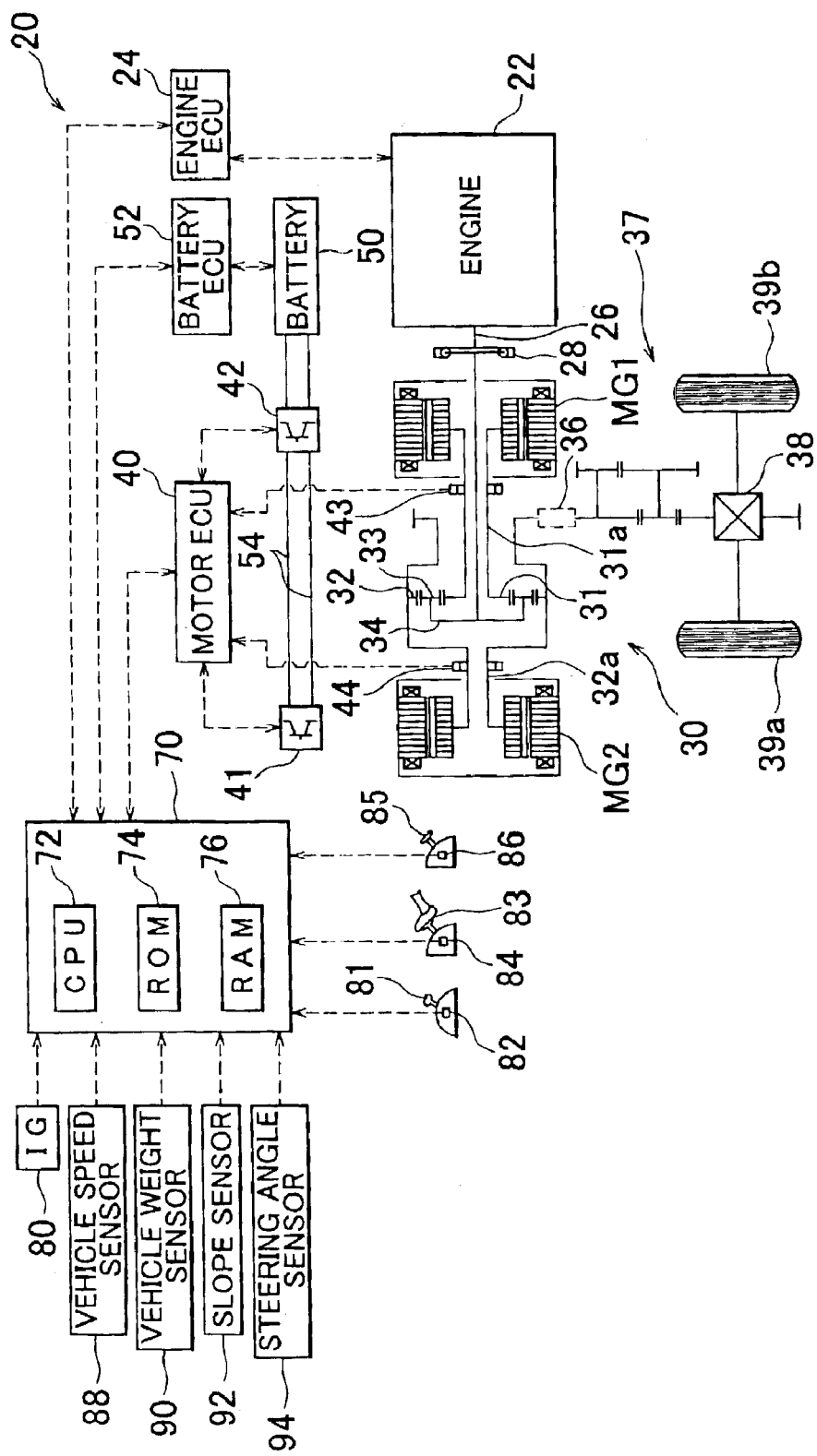
FIG. 1 is a schematic diagram illustrating the construction of a hybrid vehicle equipped with an accelerator opening setting apparatus in accordance with an exemplary embodiment of the invention.

Preferred exemplary embodiments of the invention will now be described. FIG. 1 is a schematic diagram illustrating the construction of a hybrid vehicle 20 equipped with an accelerator opening setting apparatus in accordance with an exemplary embodiment of the invention. As shown in FIG. 1, the hybrid vehicle 20 of this exemplary embodiment has an engine 22, a 3-shaft type power distribution-integration mechanism 30 connected to a crankshaft 26 as an output shaft of the engine 22 via a damper 28, an electric motor MG1 connected to the power distribution-integration mechanism 30 and capable of electric power generation, an electric motor MG2 also connected to the power distribution-integration mechanism 30, and a hybrid-purposed electronic control unit 70 for controlling the entire drive system of the vehicle.

The engine 22 is an internal combustion engine that outputs power from a hydrocarbon fuel such as gasoline, light oil, etc. The engine 22 is subjected to various operation controls, such as a fuel injection control, an ignition control, an intake air amount adjusting control, etc., by an engine-purposed electronic control unit (hereinafter, referred to as "engine ECU") 24 that accepts an input of signals from various sensors for detecting states of operation of the engine 22. The engine ECU 24 communicates with the hybrid-purposed electronic control unit 70, and operates and controls the engine 22 on the basis of control signals from the hybrid-purposed electronic control unit 70, and outputs data regarding the state of operation of the engine 22 to the hybrid-purposed electronic control unit 70.

The power distribution-integration mechanism 30 has a sun gear 31 which is an external tooth gear, a ring gear 32 which is an internal tooth gear disposed concentrically with the sun gear 31, a plurality of pinion gears 33 meshing with the sun gear 31 and also meshing with the ring gear 32, and a carrier 34 supporting the pinion gears 33 in such a manner as to allow rotation and revolution thereof. The power distribution-integration mechanism 30 is a planetary gear mechanism that performs a differential operation using the sun gear 31, the ring gear 32 and the carrier 34 as rotation elements. As for the power distribution-integration mechanism 30, the carrier 34 is connected to the crankshaft 26 of the engine 22, and the sun gear 31 is connected to the electric motor MG1, and the ring gear 32 is connected to the electric motor MG2. When the electric motor MG1 functions as a generator, the power input from the engine 22 via the carrier 34 is distributed toward the sun gear 31 and toward the ring gear 32 in accordance with their gear ratio. When the motor MG1 functions as an electric motor, the power input from the engine 22 via the carrier 34 and the power input from the motor MG1 via the sun gear 31 are integrated and output to the ring gear 32. The ring gear 32 is mechanically connected to drive wheels 39a, 39b of the vehicle, that is, front wheels thereof, via a belt 36, a gear mechanism 37 and a differential gear 38. Therefore, the power output to the ring gear 32 is output to the drive wheels 39a, 39b via the belt 36, the gear mechanism 37 and the differential gear 38. The three shafts connected to the power distribution-integration mechanism 30, as a drive system, are the crankshaft 26, that is, an output shaft of the engine 22 connected to the carrier 34, a sun gear shaft 31a that is connected to the sun gear 31 and forms a rotation shaft of the motor MG1, and a ring gear shaft 32a that is a drive shaft connected to the ring gear 32 and is mechanically connected to the drive wheels 39a, 39b.

Each of the motor MG1 and the motor MG2 is formed as a well-known synchronous generator-motor that is able to operate as a power generator and also operate as an electric motor. The motors MG1, MG2 exchange electric power with a battery 50 via inverters 41, 42. Electric power lines 54 connecting the inverters 41, 42 and the battery 50 are formed as a positive bus line and a negative bus line shared by the two inverters 41, 42 so that electric power generated by one of the two motors MG1, MG2 can be consumed by the other one of the motors. The battery 50 is charged and discharged in accordance with power generation or power shortage that occurs in the motors MG1, MG2. If the motor MG1 and the motor MG2 are balance in an electric power budget, the battery 50 is not charged nor discharged. The motors MG1, MG2 are driven and controlled by a motor-purposed electronic control unit (hereinafter, referred to as "motor ECU") 40. The motor ECU 40 receives inputs of signals needed to drive and control the motors MG1, MG2, for example, signals from rotational position detecting sensors 43, 44 for detecting the rotational positions of rotors of the motors MG1, MG2, phase current applied to the motors MG1, MG2 which are detected by current sensors (not shown), etc. The motor ECU 40 outputs switching control signals to the inverters 41, 42. The motor ECU 40 communicates with the hybrid-purposed electronic control unit 70. On the basis of control signals from the hybrid-purposed electronic control unit 70, the motor ECU 40 drives and controls the motors MG1, MG2. In accordance with needs, the motor ECU 40 outputs data regarding the state of operation of the motors MG1, MG2 to the hybrid-purposed electronic control unit 70. The battery 50 is controlled by a battery-purposed electronic control unit (hereinafter, referred to as "battery ECU") 52. The battery ECU 52 accepts an input of signals needed to control the battery 50, for example, an inter-terminal voltage from a voltage sensor (not shown) disposed between terminals of the battery 50, a charging or discharged current from a current sensor (not shown) attached to an electric power line 54 connected to an output terminal of the battery 50, a battery temperature from a temperature sensor (not shown) attached to the battery 50, etc. In accordance with needs, the battery ECU 52 outputs data regarding the state of the battery 50 to the hybrid-purposed electronic control unit 70 by means of communication. The battery ECU 52 calculates the remaining capacity (SOC) based on the integrated value of charging and discharged currents detected by the current sensor, in order to control the battery 50.

The hybrid-purposed electronic control unit 70 is formed as a microprocessor having a CPU 72 as a major component. In addition to the CPU 72, the hybrid-purposed electronic control unit 70 has a ROM 74 that stores processing programs, a RAM 76 that temporarily stores data, and input-output ports (not shown) and a communication port (not shown). The hybrid-purposed electronic control unit 70 receives inputs of an ignition signal from an ignition switch 80, a shift position SP from a shift position sensor 82 that detects the operated position of a shift lever 81, a pedal opening Ausr from an accelerator pedal position sensor 84 that detects the pedal accelerator opening Ausr corresponding to the amount of depression of an accelerator pedal 83, a brake pedal position BP from a brake pedal position sensor 86 that detects the amount of depression of a brake pedal 85, a vehicle speed V from a vehicle speed sensor 88, a vehicle weight M from a vehicle weight sensor 90, a road surface slope Rθ from a slope sensor 92, a steering angle Sθ from a steering angle sensor 94, etc., via input ports. The vehicle weight sensor 90 may be a sensor that detects the total weight of the vehicle including occupants and fuel. As for the vehicle weight sensor 90, it is also possible to adopt an arrangement in which the weight of occupants and the weight of fuel are detected and the total weight of the vehicle is calculated. As for the slope sensor 92, it is possible to adopt an arrangement in which the inclination of the vehicle is detected by a G sensor or the like, and a road surface slope Rθ is calculated. The hybrid-purposed electronic control unit 70 is connected to the engine ECU 24, the motor ECU 40 and the battery ECU 52 via communication ports as mentioned above. The hybrid-purposed electronic control unit 70 exchanges various control signals and data with the engine ECU 24, the motor ECU 40 and the battery ECU 52.

On the basis of the vehicle speed V and an accelerator opening Adrv set on the basis of the pedal opening Ausr corresponding to the amount of depression of the accelerator pedal 83 caused by a driver, the hybrid vehicle 20 calculates a requested power to be output to the ring gear shaft 32a provided as a drive shaft, and operates and controls the engine 22, the motor MG1 and the motor MG2. The operation control of the engine 22, the motor MG1 and the motor MG2 is performed in various modes, such as a torque conversion operation mode in which the engine 22 is operated and controlled so as to output a power corresponding to the requested power, and the motor MG1 and the motor MG2 are driven and controlled so that the entire power output from the engine 22 is torque-converted and output to the ring gear shaft 32a via the power distribution-integration mechanism 30, the motor MG1 and the motor MG2, a charge/discharge operation mode in which the engine 22 is operated and controlled so as to output a power corresponding to the sum of the requested power and the power needed for the charging/discharging of the battery 50, and the motor MG1 and the motor MG2 are driven and controlled so that the entire amount or a portion of the power output from the engine 22 accompanied with the charging/discharging of the battery 50 is torque-converted by the power distribution-integration mechanism 30, the motor MG1 and the motor MG2, and the requested power is output to the ring gear shaft 32a, and a motor operation mode in which the operation of the engine 22 is stopped and the power from the motor MG2 corresponding to the requested power is output to the ring gear shaft 32a.

Figure 2:
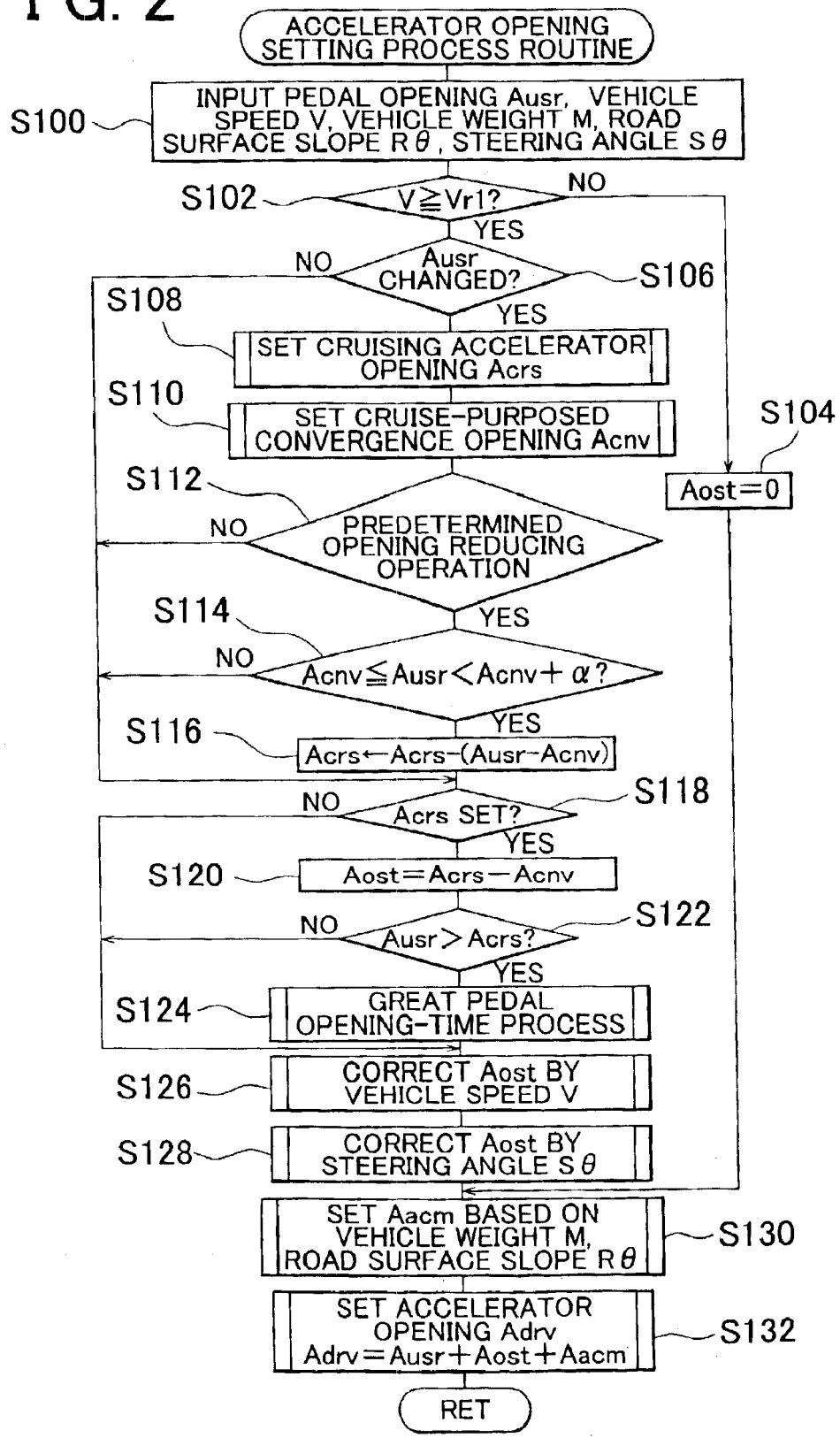
FIG. 2 is a flowchart illustrating an accelerator opening setting process routine executed by a hybrid-purposed electronic control unit.

Next described will be an operation of setting the accelerator opening Adrv in the hybrid vehicle 20 of the exemplary embodiment. In the diagram of FIG. 1, the accelerator opening setting apparatus of this exemplary embodiment is formed by the hybrid-purposed electronic control unit 70, the accelerator pedal position sensor 84 for detecting the pedal opening Ausr corresponding to the amount of depression of the accelerator pedal 83, the vehicle speed sensor 88 for detecting the vehicle speed V, the vehicle weight sensor 90 for detecting the vehicle weight M, the slope sensor 92 for detecting the road surface slope Rθ, and the steering angle sensor 94 for detecting the steering angle Sθ. FIG. 2 is a flowchart illustrating an example of an accelerator opening setting process routine executed by the hybrid-purposed electronic control unit 70. This routine is executed at every predetermined time (e.g., every 8 msec). For simplified description, the process of setting the accelerator opening Adrv will be described below mainly with regard to an operation performed when a driver depresses the accelerator pedal 83 during a stopped state of the vehicle.

When the accelerator opening setting process routine is executed, the CPU 72 first inputs the pedal accelerator opening Ausr from the accelerator pedal position sensor 84, the vehicle speed V from the vehicle speed sensor 88, the vehicle weight M from the vehicle weight sensor 90, the road surface slope Rθ from the slope sensor 92, and the steering angle Sθ from the steering angle sensor 94 (step S100), and determines whether the input vehicle speed V is at least a threshold value Vr1 (step S102). The threshold value Vr1 is a value for setting an upper limit of the vehicle speed where it is preferable to set the pedal opening Ausr directly as an accelerator opening Adrv as much as possible, for frequent operations of the accelerator pedal 83. In the exemplary embodiment, the threshold value Vr1 is set at a vehicle speed of 25 km/h. That is, during slow vehicle run below 25 km/h, the accelerator pedal 83 and the brake pedal 85 are more frequently performed than during cruise run at a constant vehicle speed, and therefore it is considered preferable to handle the pedal opening Ausr corresponding to the amount of depression of the accelerator pedal 83 directly as an accelerator opening Adrv as much as possible.

Since what is considered now is a case where a driver depresses the accelerator pedal 83 during a stopped state of the vehicle, the vehicle speed V becomes less than the threshold value Vr1 at the initial execution of this routine. At this time, value "0" is set as an offset opening Aost (step S104), and a correction opening Aacm is set on the basis of the vehicle weight M and the road surface slope Rθ (step S130), and an accelerator opening Adrv is set on the basis of the correction opening Aacm as in Expression (1) (step S132). After that, this routine ends. The offset opening Aost will be described later.

$$Adrv = Ausr + Aost + Aacm \quad (1)$$

Figure 3:
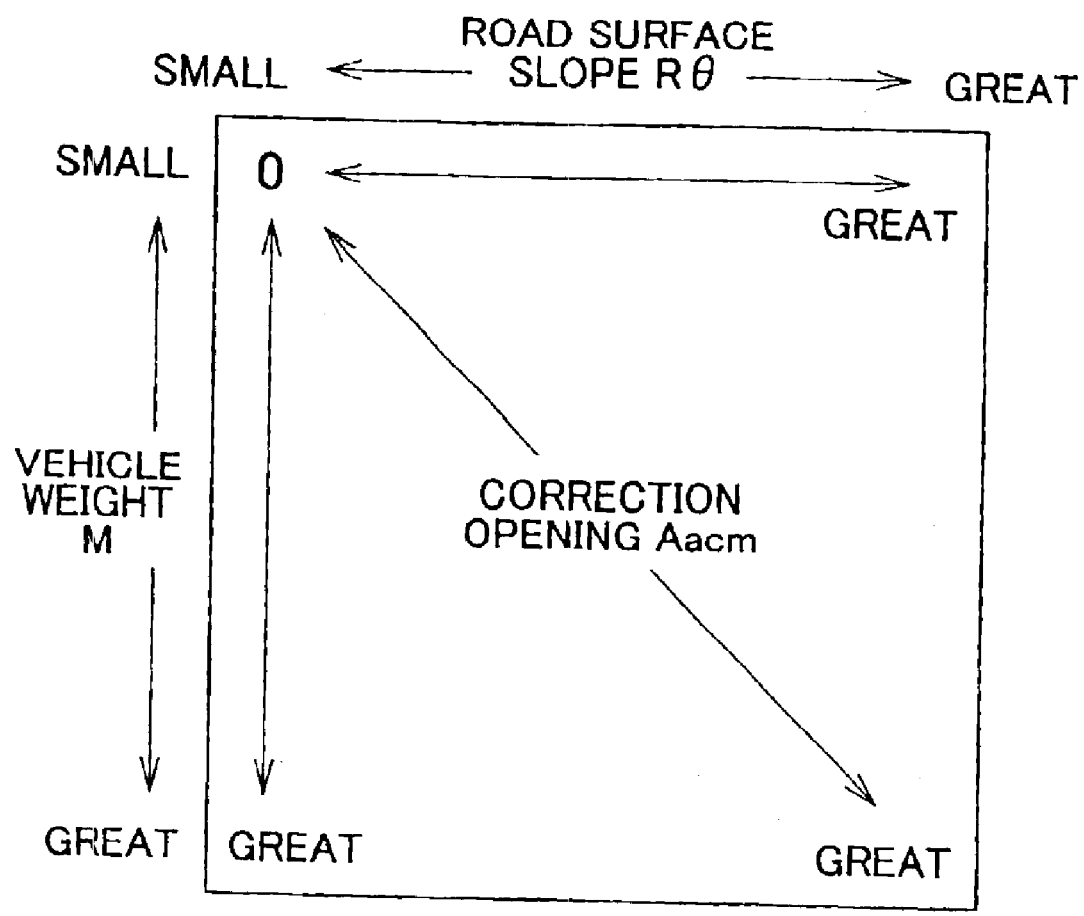
FIG. 3 is a diagram illustrating a correction opening setting map.

The process of setting the correction opening Aacm based on the vehicle weight M and the road surface slope Rθ is executed through the use of a correction opening setting map exemplified in FIG. 3. The correction opening Aacm is provided for correcting the degree of accelerator opening so that an amount of operation of the accelerator pedal 83 performed by a driver always causes a fixed acceleration of the vehicle regardless of the vehicle weight M nor the road surface slope Rθ. In the correction opening setting map exemplified in FIG. 3, adjustment is made for a tendency to set the correction opening Aacm greater with increases in the vehicle weight M, and for a tendency to set the correction opening Aacm greater with increases in the road surface slope Rθ in terms of upward slope. A condition for the correction opening Aacm as a reference value to become equal to value "0" is that the road surface slope Rθ equals 0 when the vehicle carries a predetermined amount of fuel and one occupant in relation to the vehicle weight M, that is, the vehicle is on a flat road. Therefore, when the value of correction opening Aacm is 0, the pedal opening Ausr is directly set as an accelerator opening Adrv. Furthermore, when the vehicle weight M is great and the road surface slope Rθ is an upward slope, the set correction opening Aacm is added to the pedal opening Ausr in setting an accelerator opening Adrv, so that an amount of operation of the accelerator pedal 83 performed by a driver always causes the vehicle to accelerate at a fixed acceleration. Therefore, a driver is allowed to operate the vehicle with the same manner and amounts of operation of the accelerator pedal 83 as in a case where the vehicle is on a flat road and carries one occupant, without considering the vehicle weight M nor the road surface slope Rθ.

When the vehicle speed V increases to or above the threshold value Vr1 (step S102) with the elapse of time following the depression of the accelerator pedal 83, it is determined whether the pedal opening Ausr has been changed since the previous execution of this routine (step S106). Normally in the case of a flat and straight road, the operation of the accelerator pedal 83 from a stopped state to a cruising run of the vehicle is performed in such a manner that a relatively great depression of the accelerator pedal 83 is maintained, and then the depression is reduced when the vehicle speed becomes close to a desired speed, although this operation manner may vary depending on a driver's preference in the accelerating operation. While the vehicle speed is not close to the desired speed, the depression of the accelerator pedal 83 is maintained, and therefore, the pedal opening Ausr does not change. In this case, the process proceeds to step S118, in which it is determined whether a cruising accelerator opening Acrs has been set. The cruising accelerator opening Acrs is set in this routine when the vehicle speed V becomes equal to or greater than the threshold value Vr1 and the pedal opening Ausr is changed. Therefore, during the presently considered state, the cruising accelerator opening Acrs has not been set. Therefore, the process proceeds to step S126.

In step S126, the offset opening Aost is corrected on the basis of the vehicle speed V. However, during the presently considered state, the offset opening Aost is set at "0" in step S104, and therefore, correction on the offset opening Aost has no effect. Subsequently in step S128, the offset opening Aost is corrected on the basis of the steering angle Sθ. This correction also has no effect during the presently considered state. The operation of correcting the offset opening Aost on the basis of the vehicle speed V and the steering angle Sθ will be described later. In the process that has been described above, the pedal opening Ausr has not been changed, and the offset opening Aost has been set at "0". Thus, there is substantially no difference from the state where the vehicle speed V is less than the threshold value Vr1. Therefore, the process that follows is also performed with no substantial difference. That is, a correction opening Aacm is set on the basis of the vehicle weight M and the road surface slope Rθ (step S130), and the correction opening Aacm is used to set an accelerator opening Adrv as in Expression (1) (step S132). Hence, while the depressed state of the accelerator pedal 83 is maintained, the pedal opening Ausr is directly set as an accelerator opening Adrv provided that the correction opening Aacm is "0". If the vehicle weight M is great or the road surface slope Rθ is an uphill slope, the set correction opening Aacm is added to the pedal opening Ausr so as to set an accelerator opening Adrv.

Figure 4:
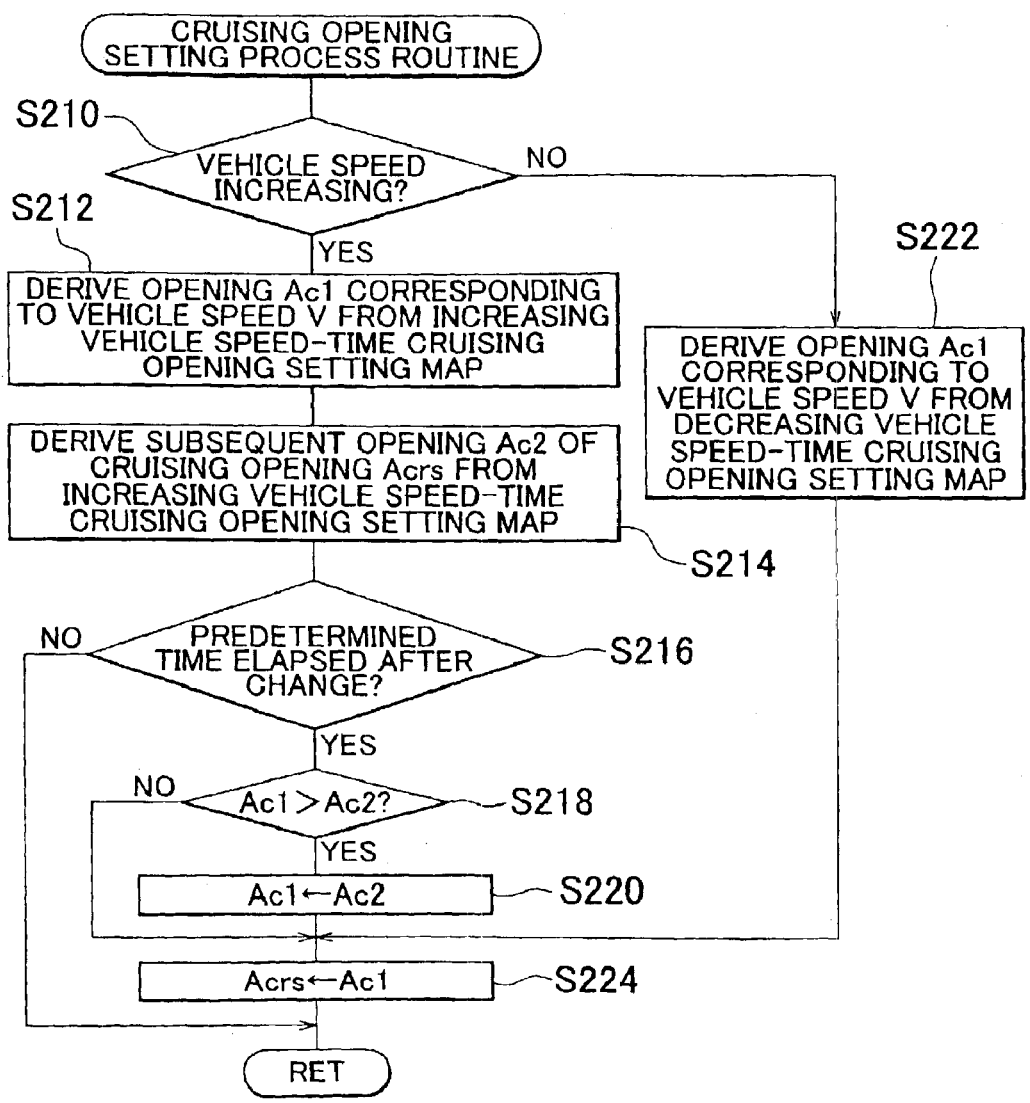
FIG. 4 is a flowchart illustrating a cruising opening setting process routine executed by the hybrid-purposed electronic control unit.

When the vehicle speed becomes close to the desired speed, the driver performs an operation of reducing the depression of the accelerator pedal 83, so that the pedal opening Ausr corresponding to the amount of depression of the accelerator pedal 83 is changed. When such a change in the pedal opening Ausr is detected (step S106), a cruising accelerator opening Acrs as a degree of accelerator opening needed for a cruise of the vehicle with one occupant on a flat road is set (step S108). The cruising accelerator opening Acrs is set in this exemplary embodiment by executing a cruising accelerator opening setting process routine exemplified in FIG. 4. The cruising opening setting process will be described below with reference to FIG. 4.

Figure 5:
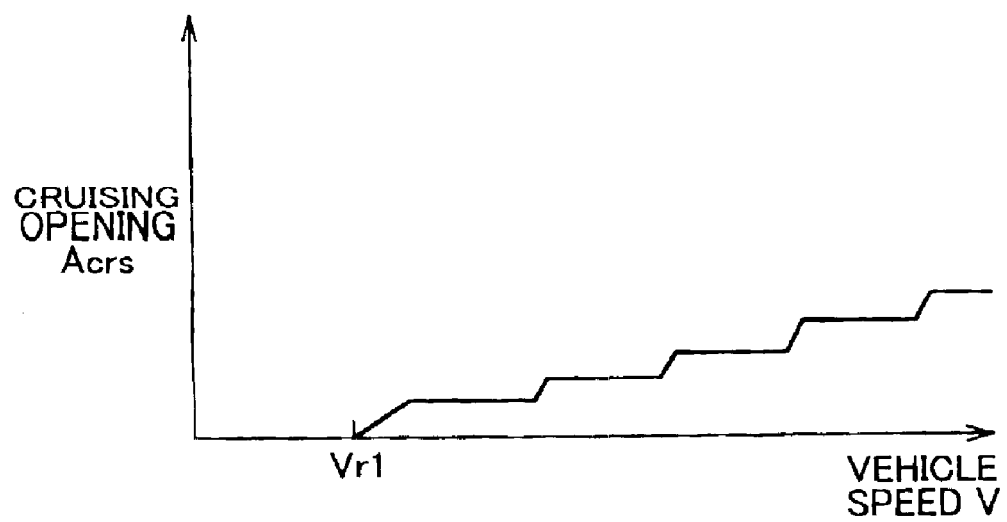
FIG. 5 is a diagram indicating an increasing vehicle speed-time cruising opening setting map.

In the cruising opening setting process routine, it is first determined whether the vehicle speed V is increasing (step S210). This determination can be made through comparison of the presently input vehicle speed V with the vehicle speed V input during the previous execution of the accelerator opening setting process routine. If the vehicle speed V is increasing, an opening Ac1 corresponding to the vehicle speed V is derived from an increasing vehicle speed-time cruising opening setting map (step S212), and an opening Ac2 of a subsequent step in the setting map that follows the presently set cruising accelerator opening Acrs is derived from the same increasing vehicle speed-time cruising opening setting map (step S214). FIG. 5 indicates an example of the increasing vehicle speed-time cruising opening setting map. As indicated in FIG. 5, the increasing vehicle speed-time cruising opening setting map has been set so that the cruising accelerator opening Acrs changes stepwise in the range of the vehicle speed V at and above the threshold value Vr1, on the basis of the accelerator opening needed for the cruising of the vehicle with one occupant on a flat road. In the exemplary embodiment, the degree of accelerator opening needed for the cruising of the vehicle corresponds to the median value of each step. The purpose of the stepwise setting of the cruising accelerator opening Acrs is to prevent the cruising accelerator opening Acrs from changing in association with small changes in the vehicle speed V. The purpose of an adjustment in which at the stepped portions, the cruising accelerator opening Acrs does not increase in a truly stepped fashion, but increases with a gradient is to prevent stepped increases in the cruising accelerator opening Acrs.

After the openings Ac1, Ac2 are derived in this manner, it is determined whether a predetermined time has elapsed following the previous changing of the cruising accelerator opening Acrs (step S216). The purpose of determining the elapse of the predetermined time is to prevent the cruising accelerator opening Acrs from sharply increasing to a great value due to a sharp acceleration. Although the predetermined time may be appropriately set, the predetermined time in this exemplary embodiment is set at a time that is approximately equal to or less than 1 second, in order to avoid low responsiveness. When the predetermined time has elapsed following the previous changing of the cruising accelerator opening Acrs, the opening Ac1 and the opening Ac2 are compared (step S218). If the opening Ac1 is greater than the opening Ac2, the opening Ac1 is substituted with the opening Ac2 (step S220), and the thus-obtained opening Ac1 is set as a cruising accelerator opening Acrs (step S224). If the opening Ac1 is less than or equal to the opening Ac2, the opening Ac1 is directly set as a cruising accelerator opening Acrs (step S224), and the routine ends.

The opening Ac1 is a cruising accelerator opening corresponding to the vehicle speed V, and the opening Ac2 is a subsequent-step cruising accelerator opening subsequent to the presently set cruising accelerator opening Acrs. Therefore, in the above-described operation, the opening Ac1 corresponding to the vehicle speed V is set as a cruising accelerator opening Acrs if the opening Ac1 equals the cruising accelerator opening at a step subsequent to the presently set cruising accelerator opening Acrs. If the opening Ac1 corresponding to the vehicle speed V is greater than the opening at the step subsequent to the presently set cruising accelerator opening Acrs, the subsequent-step opening Ac2 is set as a cruising accelerator opening Acrs. Due to the setting of the cruising accelerator opening at the step subsequent to the presently set cruising accelerator opening Acrs and the avoidance of the setting of a cruising accelerator opening Acrs until the elapse of the predetermined time following the setting (changing) of the cruising accelerator opening Acrs, the cruising accelerator opening Acrs can be set so as to increase toward a cruising opening corresponding to the vehicle speed V by a step at every elapse of the predetermined time. Thus, sharp increase in the cruising accelerator opening Acrs can be curbed. The effect of this operation will be described later.

Figure 6:
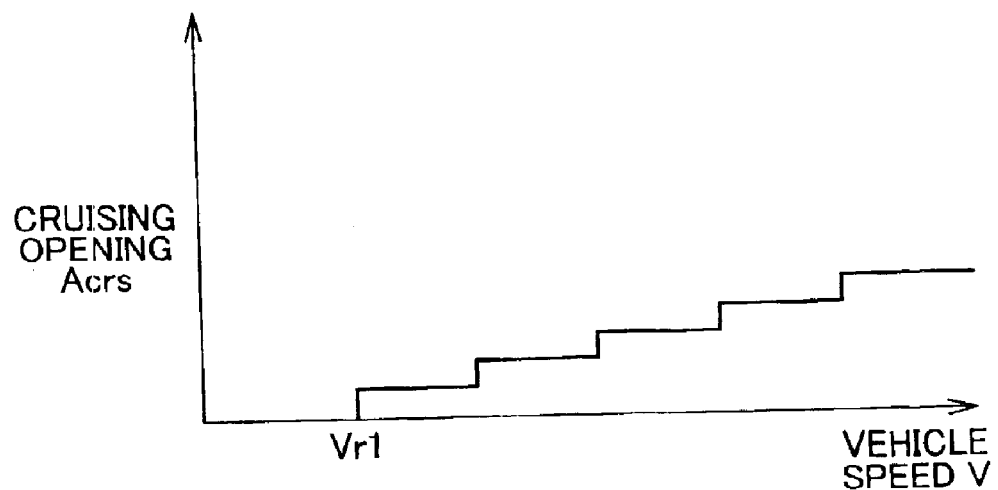
FIG. 6 is a diagram indicating a decreasing vehicle speed-time cruising opening setting map.

If it is determined in step S210 that the vehicle speed V is not increasing, that is, the vehicle is decelerating, an opening Ac1 corresponding to the vehicle speed V is derived from a decreasing vehicle speed-time cruising opening setting map (step S222), and the derived opening Ac1 is set as a cruising accelerator opening Acrs (step S224), and the routine ends. FIG. 6 indicates an example of the decreasing vehicle speed-time cruising opening setting map. Similar to the increasing vehicle speed-time cruising opening setting map exemplified in FIG. 5, the decreasing vehicle speed-time cruising opening setting map is set so that the cruising accelerator opening Acrs changes stepwise within the range of the vehicle speed V equal to or above the threshold value Vr1, on the basis of the accelerator opening needed for the flat-road cruising of the vehicle carrying one occupant. In the increasing vehicle speed-time cruising opening setting map, the degree of accelerator opening needed for the cruising of the vehicle corresponds to the median value of each step as described above. In contrast, in the decreasing vehicle speed-time cruising opening setting map, the degree of accelerator opening needed for the cruising of the vehicle corresponds to a stepped portion of each step so that hysteresis is provided for the times of increase and decrease in the vehicle speed. In this manner, frequent changes of the cruising accelerator opening Acrs in response to slight increases or decreases in the vehicle speed V are prevented. Furthermore, in the decreasing vehicle speed-time cruising opening setting map, the cruising accelerator opening Acrs changes in a truly stepped fashion whereas in the increasing vehicle speed-time cruising opening setting map, the step portions are provided with appropriate gradients. The effect of the step setting will be described later.

Figure 7:
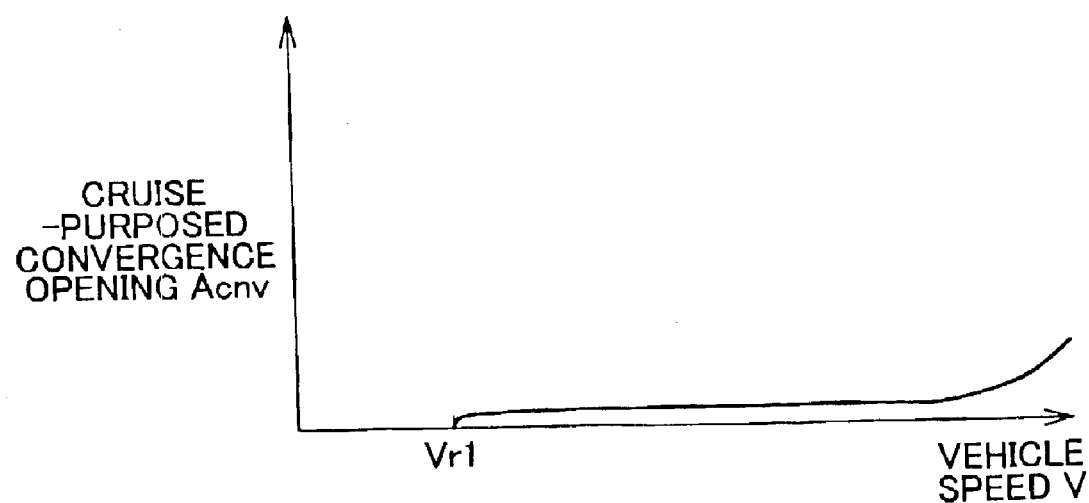
FIG. 7 is a diagram indicating a cruise-purposed convergence opening setting map.

Referring back to the accelerator opening setting process routine of FIG. 2, the setting of the cruising accelerator opening Acrs is followed by the setting of a cruise-purposed convergence opening Acnv (step S110). The cruise-purposed convergence opening Acnv is set as a pedal opening Ausr corresponding to the amount of depression of the accelerator pedal 83 that is requested of a driver in order to cruise the vehicle at the then vehicle speed V, and is set at a value that is less than the cruising accelerator opening Acrs. In this exemplary embodiment, a cruise-purposed convergence opening Acnv corresponding to the vehicle speed V is derived from a cruise-purposed convergence opening setting map. FIG. 7 indicates an example of the cruise-purposed convergence opening setting map. As indicated in FIG. 7, greater cruise-purposed convergence openings Acnv are derived with respect to greater vehicle speeds V in the map of this exemplary embodiment.

Next, it is determined whether a predetermined opening reducing operation of the accelerator pedal 83 has been performed (step S112). The predetermined opening reducing operation is defined as an operation of a driver for changing from an accelerating state to a cruising state, for example, an operation of undepressing the accelerator pedal 83 from a state where the depression of the accelerator pedal 83 is greater than a predetermined amount (e.g., 40%) while the vehicle speed V is greater than or equal to the threshold value Vr1, within a short time (e.g., an operation of reducing the amount of depression of the accelerator pedal 83 by at least 15% within 500 msec). If the predetermined opening reducing operation of the accelerator pedal 83 is performed, it is then determined whether the pedal opening Ausr is within a predetermined range α above the cruise-purposed convergence opening Acnv (step S114). If the pedal opening Ausr is within this range, the cruising accelerator opening Acrs is set at a value obtained by subtracting a deviation between the pedal opening Ausr and the cruise-purposed convergence opening Acnv from the cruising accelerator opening Acrs as in Expression (2) (step S116).

$$Acrs \leftarrow Acrs - (Ausr - Acnv) \qquad (2)$$

The predetermined range α is a tolerance range that is provided because it is difficult to bring the depression of the accelerator pedal 83 from the amount of depression corresponding to the pedal opening Ausr exactly to the amount of depression corresponding to the cruise-purposed convergence opening Acnv merely through a driver's operation of the accelerator pedal 83. The adjustment of the cruising accelerator opening Acrs is performed so that the cruising accelerator opening Acrs will absorb the deviation caused by the provision of the tolerance range. Due to this correction of the cruising accelerator opening Acrs, it is possible to perform a control while the pedal opening Ausr is regarded as the cruise-purposed convergence opening Acnv.

After the adjustment of the cruising accelerator opening Acrs is performed in step S116, or if it is determined in step S112 that the predetermined opening reducing operation of the accelerator pedal 83 has not been performed, or if it is determined in step S114 that the pedal opening Ausr is not within the predetermined range α above the cruise-purposed convergence opening Acnv, the process proceeds to step S118, in which it is determined whether the cruising accelerator opening Acrs has been set. Since in the presently considered state, the driver has performed an operation of reducing the depression of the accelerator pedal 83 because of the vehicle speed approaching the desired speed, the cruising accelerator opening Acrs has already been set. It should be noted herein that the process performed when the vehicle speed V has changed from a level below the threshold value Vr1 to a level equal to or above the threshold value Vr1 without a change in the pedal opening Ausr has been described above.

If it is determined that the cruising accelerator opening Acrs has already been set, the deviation between the cruising accelerator opening Acrs and the cruise-purposed convergence opening Acnv is set as an offset opening Aost (step S1120). The offset opening Aost is an amount of correction that is added to the pedal opening Ausr corresponding to the amount of depression of the accelerator pedal 83 performed by the driver, in order to set an accelerator opening Adrv. Since the offset opening Aost is a deviation between the cruising accelerator opening Acrs and the cruise-purposed convergence opening Acnv, substitution of the offset opening Aost in Expression (1) provides Expression (3).

$$Adrv \leftarrow Acrs + (Ausr - Acnv) + Aacm \qquad (3)$$

If the correction opening Aacm based on the vehicle weight M and the road surface slope Rθ is ignored, Expression (3) means that when the pedal opening Ausr equals the cruise-purposed convergence opening Acnv, the cruising accelerator opening Acrs is set as an accelerator opening Adrv, and therefore the vehicle can be cruised at the then vehicle speed V, and that the cruising speed can be adjusted in an increasing or decreasing direction depending on whether the pedal opening Ausr is greater or less than the cruise-purposed convergence opening Acnv.

In this exemplary embodiment, due to the setting of the offset opening Aost and the addition of the offset opening Aost to the pedal opening Ausr, it is possible to cruise the vehicle at the vehicle speed V with the driver's depression of the accelerator pedal 83 being less than the amount of depression needed for the cruising of the vehicle speed V at the vehicle speed V. As mentioned above, when the vehicle speed V is increasing, the cruising accelerator opening Acrs is set with reference to the increasing vehicle speed-time cruising opening setting map in which the stepped portions are provided with gradients as exemplified in FIG. 5. The purpose of providing the stepped portions with gradients is to avoid an event that the accelerator opening Adrv sharply increases in association with a stepwise sharp increase in the offset opening Aost set as a deviation between the cruising accelerator opening Acrs and the cruise-purposed convergence opening Acnv. The reason why the stepped portions are not provided with gradients in the decreasing vehicle speed-time cruising opening setting map exemplified in FIG. 6 is that a sharp decrease in the accelerator opening Adrv in association with a stepwise sharp offset opening Aost during decrease in the vehicle speed V will not cause any problem in operation of the vehicle.

Figure 8:
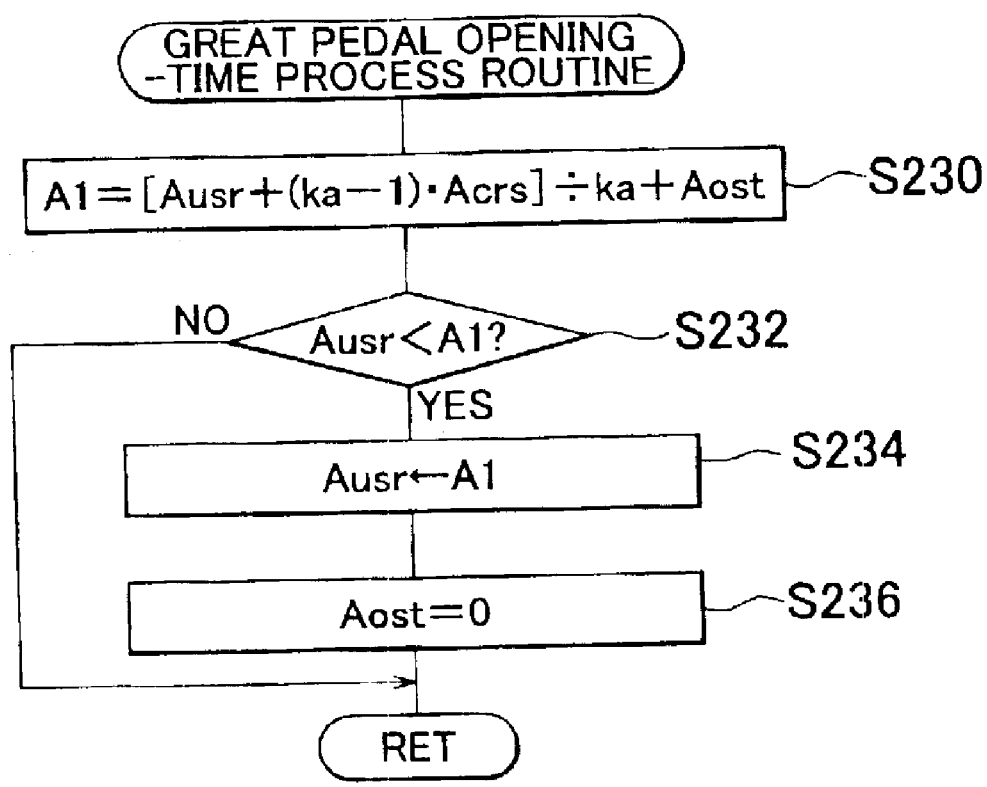
FIG. 8 is a flowchart illustrating a great pedal opening-time process routine executed by the hybrid-purposed electronic control unit.

After the offset opening Aost is set as described above, the pedal opening Ausr is compared with the cruising accelerator opening Acrs (step S122). If the pedal opening Ausr is greater than the cruising accelerator opening Acrs, a great pedal opening-time process is executed (step S124), so that the pedal opening Ausr corresponding to the amount of depression of the accelerator pedal 83 performed by the driver will be set as an accelerator opening Adrv as much as possible. This process is executed by a great pedal opening-time process routine exemplified in FIG. 8. In the great pedal opening-time process routine, an adjusted opening A1 is calculated as in Expression (4) (step S230).

$$A1 = \{Ausr + (k-1) \cdot Acrs\} \div k + Aost \qquad (4)$$

Then, if the pedal opening Ausr is less than the calculated adjusted opening A1, the adjusted opening A1 is substituted for the pedal opening Ausr (step S234). After that, the offset opening Aost is set at "0" (step S236), and the process ends. In Expression (4), k is a constant. In this exemplary embodiment, value 4 is used as k.

Figure 9:
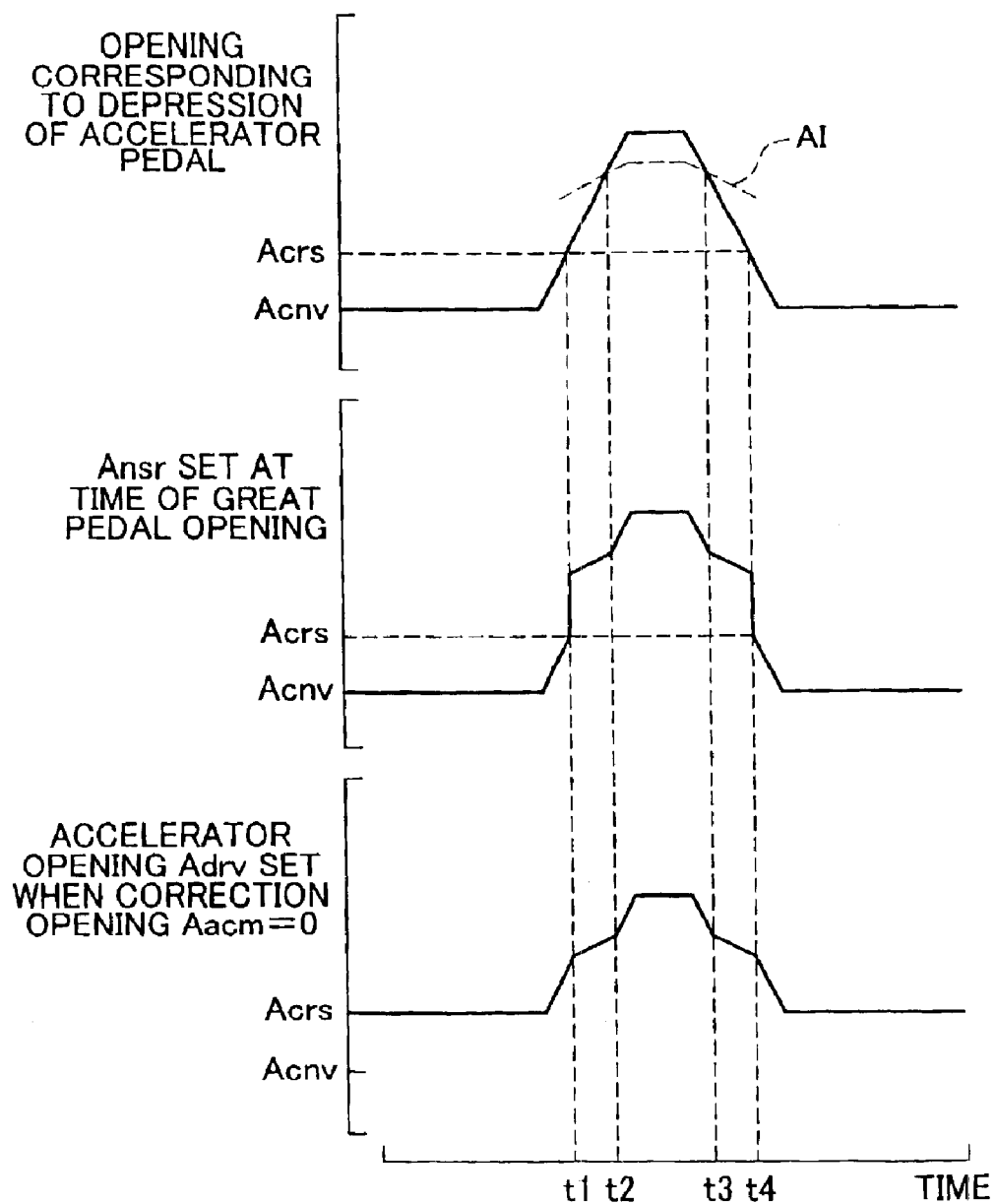
FIG. 9 is a diagram exemplifying time-dependent changes in the pedal opening Ausr and the accelerator opening Adrv set by the great pedal opening-time process routine.

FIG. 9 exemplifies time-dependent changes in the opening corresponding to the depression of the accelerator pedal 83 during great pedal opening, time-dependent changes in the pedal opening Ausr set by the great pedal opening-time process, and time-dependent changes in the accelerator opening Adrv set when the correction opening Aacm based on the vehicle weight M and the road surface slope Rθ is "0". As indicated in FIG. 9, the great pedal opening-time process is not performed until a time point t1, that is, the process is not performed while the pedal opening Ausr is less than the cruising accelerator opening Acrs. Therefore, until the time point t1, the degree of opening corresponding to the amount of depression of the accelerator pedal 83 is directly set as a pedal opening Ausr, and the offset opening Aost is added to the pedal opening Ausr so as to set an accelerator opening Adrv.

During a period from the time point t1 to a time point t2 during which the pedal opening Ausr is greater than the cruising accelerator opening Acrs but is less than the adjusted opening A1, the adjusted opening A1 calculated as in Expression (4) is set as a pedal opening Ausr (see a broken line A1 in an upper portion of FIG. 9). Although the pedal opening Ausr sharply increases by the amount of offset opening Aost during this period, the accelerator opening Adrv set based on the sum of the pedal opening Ausr and the offset opening Aost does not sharply increase since the offset opening Aost is set at "0" in the great pedal opening-time process. During a period from the time point t2 to a time point t3 during which the pedal opening Ausr is greater than the adjusted opening A1, the pedal opening Ausr is not set at the adjusted opening A1, and the offset opening Aost is set at "0", so that the pedal opening Ausr is directly set as an accelerator opening Adrv. During a period from the time point t3 to a time point t4 during which the pedal opening Ausr is greater than the cruising accelerator opening Acrs, but is less than the adjusted opening A1, the pedal opening Ausr is set at the adjusted opening A1, which is directly set as an accelerator opening Adrv, as in the period from the time point t1 to the time point t2. During a period following the time point t4 during which the pedal opening Ausr is less than the cruising accelerator opening Acrs, the great pedal opening-time process is not performed, so that the opening corresponding to the amount of depression of the accelerator pedal 83 is directly set as a pedal opening Ausr, and the offset opening Aost is added to the pedal opening Ausr so as to set an accelerator opening Adrv, as in the period up to the time point t1. As can be understood from this example, during the period of great pedal opening during which the pedal opening Ausr corresponding to the amount of depression of the accelerator pedal 83 is greater than the cruising accelerator opening Acrs, adjustment is made such that the pedal opening Ausr is directly set as an accelerator opening Adrv as much as possible. Also, adjustment is made so as to achieve a smooth transition to or from a normal state where the accelerator opening Adrv is set with addition of the offset opening Aost.

Figure 10:
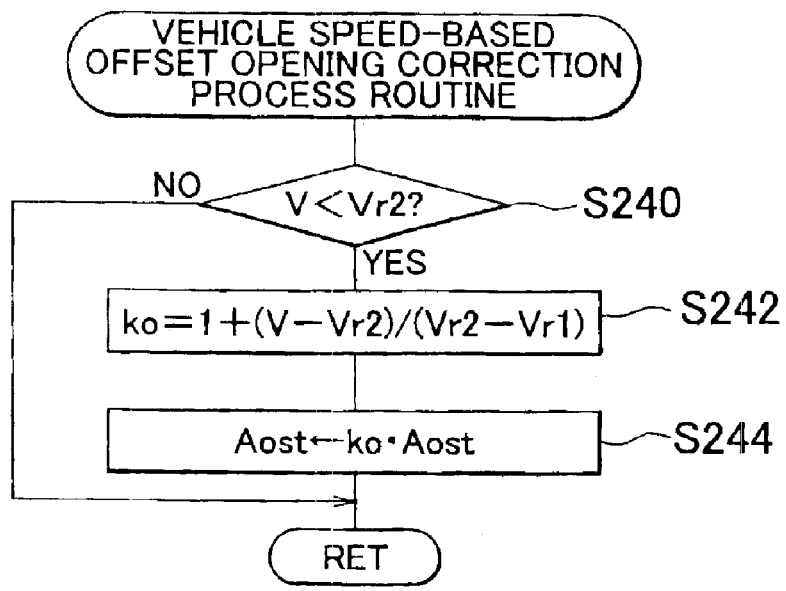
FIG. 10 is a flowchart illustrating a vehicle speed-based offset opening correction process routine.

After the pedal opening-time process is executed, or if it is determined in step S118 that the cruising accelerator opening Acrs has not been set, an operation of correcting the offset opening Aost based on the vehicle speed V or the steering angle Sθ is executed (steps S126 and S128). The operation of correcting the offset opening Aost based on the vehicle speed V is executed by a vehicle speed-based offset opening correction process routine exemplified in FIG. 10. In this routine, the vehicle speed V is compared with a threshold value Vr2 (step S240). If the vehicle speed V is less than threshold value Vr2, a correction factor ko is calculated as in Expression (5) (step S242), and the offset opening Aost is multiplied by the correction factor ko (step S244).

$$ko=1+(V-Vr2)/(Vr2-Vr1) \quad (5)$$

Conversely, if the vehicle speed V is greater than or equal to the threshold value Vr2, the correction of the offset opening Aost based on the vehicle speed V is not performed. The threshold value Vr2 is provided so as to set a vehicle speed range that allows smooth transition from the state where the vehicle speed V is less than the threshold value Vr1 and the pedal opening Ausr is directly set as an accelerator opening Adrv to a state where the offset opening Aost is added to the pedal opening Ausr so as to set an accelerator opening Adrv. The threshold value Vr2 is set greater than the threshold value Vr1, and is set at a vehicle speed of 35 km/h in this exemplary embodiment.

Figure 11:
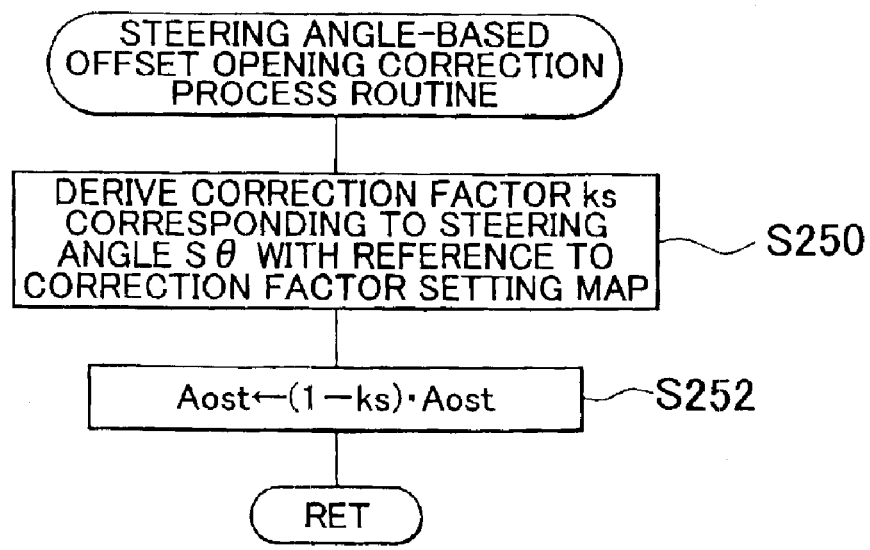
FIG. 11 is a flowchart illustrating a steering angle-based offset opening correction process routine.

The operation of correcting the offset opening Aost based on the steering angle Sθ is executed by a steering angle-based offset opening correction process routine exemplified in FIG. 11. In this routine, a correction factor ks corresponding to the steering angle Sθ is derived from a correction factor setting map (step S250). The derived correction factor ks is used to correct the offset opening Aost as in Expression (6) (step S252).

$$Aost \leftarrow (1-ks) \times Aost \quad (6)$$

Figure 12:
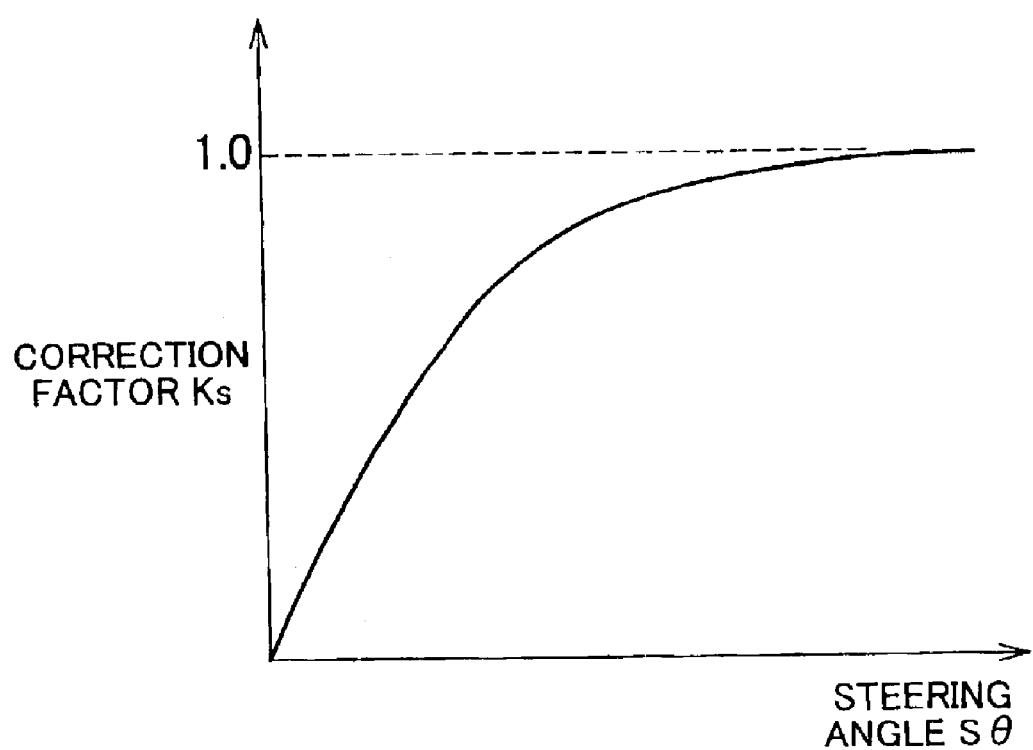
FIG. 12 is a diagram indicating a correction factor setting map.

FIG. 12 indicates an example w2 of the correction factor setting map. As indicated in FIG. 12, greater correction factors ks are set for greater steering angles Sθ in this exemplary embodiment. Using this correction factor setting map and Expression (6), the offset opening Aost is corrected so that the offset opening Aost decreases with increases in the steering angle Sθ in this exemplary embodiment. That is, if the steering angle Sθ is great, the pedal opening Ausr is set as an accelerator opening Adrv.

After the process of correcting the offset opening Aost based on the vehicle speed V or the steering angle Sθ is completed, a correction opening Aacm is set based on the vehicle weight M or the road surface slope Rθ (step S130) as mentioned above. Subsequently, an accelerator opening Adrv is set as in Expression (1), and the accelerator opening setting process routine ends.

According to the above-described hybrid vehicle 20 of this exemplary embodiment, it is possible to cruise the vehicle at a vehicle speed V merely by bringing the pedal opening Ausr corresponding to the amount of depression of the accelerator pedal 83 equal to the cruise-purposed convergence opening Acnv that is less than the cruising accelerator opening Acrs corresponding to the vehicle speed V, that is, by means of a reduced amount of operation of the accelerator pedal 83. Therefore, the burden on a driver for a cruising operation can be reduced. Furthermore, since the cruising accelerator opening Acrs and the offset opening Aost are set in association with an operation of reducing the depression of the accelerator pedal 83 from an accelerating state, it is possible to ensure a good operation feeling for a driver.

Furthermore, according to the hybrid vehicle 20 of the exemplary embodiment, if the predetermined opening reducing operation of the accelerator pedal 83 is performed by a driver, it is considered that the pedal opening Ausr becomes equal to the cruise-purposed convergence opening Acnv due to the operation of the driver provided that the pedal opening Ausr is within the predetermined range a even though the pedal opening Ausr is not equal to the cruise-purposed convergence opening Acnv. Therefore, the vehicle can be cruised at a desired vehicle speed without frequent operations of the accelerator pedal 83.

Still further, according to the hybrid vehicle 20 of the exemplary embodiment, if the vehicle speed V is in the range below the threshold value Vr1 where it is considered that the accelerator pedal 83 is frequently operated, process is performed so that the pedal opening Ausr will be directly set as an accelerator opening Adrv as much as possible. Therefore, it is possible to directly reflect a driver's operation of the accelerator pedal 83. Furthermore, if the vehicle speed V is greater than or equal to the threshold value Vr1, but is less than the threshold value Vr2, the offset opening Aost is corrected so that the offset opening Aost increases with increases in the vehicle speed V. Therefore, a sharp change in the accelerator opening Adrv without an operation of the accelerator pedal 83 can be prevented. Hence, it is possible to achieve smooth transition between the state where the pedal opening Ausr is directly set as an accelerator opening Adrv and the state where the sum of the pedal opening Ausr and the offset opening Aost is set as an accelerator opening Adrv.

Furthermore, according to the hybrid vehicle 20 of the exemplary embodiment, since the cruising accelerator opening Acrs is set stepwise in accordance with the vehicle speed V, it is possible to prevent an event where the cruising speed gradually changes due to changes in the cruising accelerator opening Acrs made in association with small changes in the vehicle speed V. Further, since the cruising accelerator opening Acrs is set with hysteresis with respect to increases and decreases in the vehicle speed V, it is possible to prevent an event where the cruising accelerator opening Acrs is changed in response to slight increases or decreases in the vehicle speed V.

According to the hybrid vehicle 20 of the exemplary embodiment, if a driver greatly depresses the accelerator pedal 83, the pedal opening Ausr corresponding to the amount of depression of the accelerator pedal 83 is directly set as an accelerator opening Adrv. Therefore, it is possible to directly reflect a driver's operation of the accelerator pedal 83. Furthermore, since transition is smoothly caused between the state where the sum of the pedal opening Ausr and the offset opening Aost is set as an accelerator opening Adrv and the state where the pedal opening Ausr is directly set as an accelerator opening Adrv, it is possible to prevent the set accelerator opening Adrv from sharply changing without an operation of the accelerator pedal 83.

According to the hybrid vehicle 20 of the exemplary embodiment, the offset opening Aost is corrected so as to decrease with increases in the steering angle Sθ. Therefore, it is possible to set an accelerator opening Adrv close to the pedal opening Ausr when the steering angle Sθ is great. That is, an operation of the accelerator pedal 83 can be directly reflected when the steering angle Sθ is great.

According to the hybrid vehicle 20 of the exemplary embodiment, the correction opening Aacm is set so that the vehicle is accelerated at a substantially fixed acceleration in response to a given amount of operation of the accelerator pedal 83 performed by a driver, regardless of the vehicle weight M. Therefore, it is possible to provide a non-changing drive feeling for a driver regardless of the vehicle weight M, that is, regardless of the number of occupants or the amount of load carried by the vehicle. Furthermore, according to the hybrid vehicle 20 of the exemplary embodiment, the correction opening Aacm is set so that the vehicle will be accelerated at a substantially fixed acceleration in response to a given amount of operation of the accelerator pedal 83 performed by a driver, regardless of the road surface slope Rθ. Therefore, it is possible to provide a non-changing drive feeling for a driver regardless of the road surface slope Rθ.

In the hybrid vehicle 20 of the exemplary embodiment, the cruise-purposed convergence opening Acnv and the cruising accelerator opening Acrs corresponding to the vehicle speed V are set, and the offset opening Aost as a deviation between the cruising accelerator opening Acrs and the cruise-purposed convergence opening Acnv is set. Basically, the accelerator opening Adrv is set at the sum of a set offset opening Aost and the pedal opening Ausr corresponding to the amount of depression of the accelerator pedal 83 performed by a driver. However, it is also appropriate to adopt an arrangement in which the offset opening Aost is merely set corresponding to the vehicle speed V without setting the cruising accelerator opening Acrs or the cruise-purposed convergence opening Acnv, and the accelerator opening Adrv is set at the sum of the set offset opening Aost and the pedal opening Ausr corresponding to the amount of depression of the accelerator pedal 83 performed by a driver. In such embodiment, instead of the increasing vehicle speed-time cruising opening setting map which is indicated in FIG. 5 of the above embodiment, an increasing vehicle speed-time off-set opening setting map may be provided. The increasing vehicle speed-time off-set opening setting map is set so that the off-set opening changes stepwise in the range of the vehicle speed V at and the threshold value Vr1, on the basis of the accelerator opening needed for the cruising of the vehicle with one occupant on a flat road. As the same, instead of the decreasing vehicle speed-time off-set opening setting map which is indicated in FIG. 6 of the above embodiment, a decreasing vehicle speed-time offset opening setting map may be provided. The decreasing vehicle speed-time off-set opening setting map is set so that the cruising accelerator opening Acrs changes stepwise within the range of the vehicle speed V equal to or above the threshold value Vr1, on the basis of the accelerator opening needed for the flat-road cruising of the vehicle carrying one occupant. In the increasing vehicle speed-time off-set opening setting map, the degree of accelerator opening needed for the cruising of the vehicle corresponds to the median value of each step as described above. In contrast, in the decreasing vehicle off-set opening setting map, the degree of accelerator opening needed for the cruising of the vehicle corresponds to a stepped portion of each step so that hysteresis is provided for the times of increase and decrease in the vehicle speed. In this manner, frequent changes of the cruising accelerator opening Acrs in response to slight increases or decreases in the vehicle speed V are prevented. In this arrangement, too, it is possible to perform the process for the case where the vehicle speed V is less than the threshold value Vr1, the great pedal opening-time process, the process of correcting the offset opening Aost based on the vehicle speed V, the process of correcting the offset opening Aost based on the steering angle Sθ, and the process of setting the correction opening Aacm based on the vehicle weight M or the road surface slope Rθ, in substantially the same manners as described above.

In the hybrid vehicle 20 of the exemplary embodiment, the cruising accelerator opening Acrs corresponding to the vehicle speed V is set in a step change fashion. The number of steps in this setting is arbitrary. It is also possible to adopt an arrangement in which the cruising accelerator opening Acrs is not set in a fashion of a step change with respect to the vehicle speed V. Furthermore, in the hybrid vehicle 20 of the exemplary embodiment, a cruising accelerator opening Acrs is set by using the increasing vehicle speed-time cruising opening setting map during an increase in the vehicle speed V, and by using the decreasing vehicle speed-time cruising opening setting map during a decrease in the vehicle speed V. However, it is also possible to set a cruising accelerator opening Acrs by using one and the same setting map both during an increase in the vehicle speed V and during a decrease in the vehicle speed V. In this case, the cruising accelerator opening Acrs may be set with hysteresis with respect to increases and decreases in the vehicle speed V, and may also be set without such hysteresis. Still further, although in the hybrid vehicle 20 of the exemplary embodiment, the cruising accelerator opening Acrs corresponding to the vehicle speed V is set in a step change manner, it is also possible to set the cruising accelerator opening Acrs in such a manner as to change linearly with respect to the vehicle speed V.

The hybrid vehicle 20 of the exemplary embodiment uses the map that sets the cruising accelerator opening Acrs based on the accelerator opening needed to cruise the vehicle with one occupant on a flat road. However, any suitable reference or the like for setting the cruising accelerator opening Acrs may be adopted. The road does not need to be flat. The number of occupants does not need to be one.

In the hybrid vehicle 20 of the exemplary embodiment, when the vehicle speed V is less than the threshold value Vr1, the offset opening Aost is not set, but the pedal opening Ausr is directly set as an accelerator opening Adrv. However, it is also possible to set an offset opening Aost even when the vehicle speed V is less than the threshold value Vr1.

In the hybrid vehicle 20 of the exemplary embodiment, the correction opening Aacm set on the basis of the vehicle weight M and the road surface slope Rθ is used to set the accelerator opening Adrv so that the vehicle will be accelerated at a substantially fixed acceleration in response to a given amount of driver's operation of the accelerator pedal 83 regardless of the vehicle weight M nor the road surface slope Rθ. However, it is also possible to set the accelerator opening Adrv by using a correction opening Aacm based on the vehicle weight M without considering the road surface slope Rθ, or set the accelerator opening Adrv by using a correction opening Aacm based on the road surface slope Rθ without considering the vehicle weight M, or set the accelerator opening Adrv without considering the vehicle weight M nor the road surface slope Rθ.

In the hybrid vehicle 20 of the exemplary embodiment, the offset opening Aost is corrected so that the offset opening Aost decreases with increasing steering angle Sθ. It is also possible to correct the offset opening Aost in such a manner that the offset opening Aost is not set when the steering angle Sθ is greater than or equal to a predetermined angle. It is also appropriate to omit the correction of the offset opening Aost based on the steering angle Sθ.

Although the exemplary embodiment is described above in conjunction with the hybrid vehicle 20 equipped with the engine 22, the power distribution-integration mechanism 30, the motor MG1, the motor MG2, and the accelerator opening setting apparatus, the invention is applicable to any vehicle as long as the vehicle is equipped with an electronic control unit, a vehicle speed sensor for detecting the vehicle speed V, and an accelerator pedal position sensor for detecting the pedal opening Ausr corresponding to the amount of depression of the accelerator pedal which form a basic accelerator opening setting apparatus, and runs on a drive power based on the accelerator opening Adrv set.

The controllers (e.g., the electronic control units 24, 40, 52 and 70) of the illustrated exemplary embodiments are implemented as one or more programmed general purpose computers. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations, which are exemplary, other combinations and configurations, including more less or only a single element, are also within the spirit and scope of the invention.

What is claimed is:

1. An accelerator opening setting apparatus of a motor vehicle for setting an accelerator opening in accordance with an amount of operation of an accelerator pedal, comprising:

a first detector that detects a vehicle speed;

a second detector that detects an operational state of the accelerator pedal;

a first storage that stores an accelerator opening corresponding to a vehicle speed at which the vehicle cruises in a predetermined condition as a cruise-purpose accelerator opening;

a second storage that stores an amount of operation of the accelerator pedal occurring at a time of a cruise corresponding to the vehicle speed as a cruising operation amount; and a controller that sets the cruise-purpose accelerator opening corresponding to the vehicle speed detected by the first detector among the cruise-purpose accelerator openings stored in the first storage, as the accelerator opening, if the amount of operation of the accelerator pedal detected by the second detector equals a cruising operation amount corresponding to the detected vehicle speed among cruising operation amounts stored in the second storage.

2. The accelerator opening setting apparatus according to claim 1, wherein the cruise-purpose accelerator opening is set stepwise with respect to the vehicle speed.

3. The accelerator opening setting apparatus according to claim 2, wherein the cruise-purpose accelerator opening is set so as to equal an accelerator opening that causes the vehicle, in the predetermined condition, to cruise at a vehicle speed that appears substantially in the middle of each step.

4. The accelerator opening setting apparatus according to claim 2, wherein the cruise-purpose accelerator opening is set with a hysteresis with respect to the vehicle speed.

5. The accelerator opening setting apparatus according to claim 2, wherein the cruise-purpose accelerator opening is set so that there is a stepped portion where the cruise-purpose accelerator opening changes linearly with respect to the vehicle speed.

6. The accelerator opening setting apparatus according to claim 1, wherein the cruise-purpose accelerator opening is set when the vehicle speed is at least a predetermined vehicle speed.

7. The accelerator opening setting apparatus according to claim 1, wherein if it is detected by the second detector that the accelerator pedal is operated to an amount of operation that is greater than the cruising operation amount corresponding to the vehicle speed by at least a predetermined amount, and then is returned to a side of the cruising operation amount corresponding to the vehicle speed so that the accelerator pedal has an amount of operation that is within a predetermined range from the cruising operation amount corresponding to the vehicle speed, the controller regards the amount of operation of the accelerator pedal as the cruising operation amount corresponding to the vehicle speed in setting the accelerator opening.

8. The accelerator opening setting apparatus according to claim 1, wherein the controller sets a deviation between the cruising operation amount corresponding to the vehicle speed and a pedal-corresponding opening corresponding to the cruising operation amount corresponding to the vehicle speed, among pedal-corresponding openings corresponding to the amount of operation of the accelerator pedal, as an offset opening, and sets the accelerator opening at a sum of the pedal-corresponding opening corresponding to the amount of operation of the accelerator pedal detected by the second detector and the set offset opening.

9. The accelerator opening setting apparatus according to claim 8, wherein if the vehicle speed detected by the first detector is less than a predetermined vehicle speed, the controller sets the pedal-corresponding opening corresponding to the amount of operation of the accelerator pedal detected by the second detector as an accelerator opening.

10. The accelerator opening setting apparatus according to claim 8, wherein if the second detector detects a fixation of the amount of operation of the accelerator pedal, the controller sets the accelerator opening by using the cruising operation amount occurring when the fixation of the amount of operation of the accelerator pedal is detected, regardless of the vehicle speed detected by the first detector.

11. The accelerator opening setting apparatus according to claim 10, wherein if the second detector detects a fixation of the amount of operation of the accelerator pedal, and then detects a change in the amount of operation of the accelerator pedal, the controller sets the accelerator opening by using a cruise-purpose accelerator opening that is changed from the cruise-purpose accelerator opening occurring when the fixation of the amount of operation of the accelerator pedal is detected, toward the cruise-purpose accelerator opening corresponding to the vehicle speed detected by the first detector, at a predetermined rate of change per time.

12. The accelerator opening setting apparatus according to claim 8, wherein if the pedal-corresponding opening corresponding to the amount of operation of the accelerator pedal detected by the second detector is at least a predetermined opening, the controller sets the pedal-corresponding opening as an accelerator opening.

13. The accelerator opening setting apparatus according to claim 12, wherein the predetermined opening is set at an opening that is greater than a cruise-purpose accelerator opening corresponding to the vehicle speed detected by the first detector.

14. The accelerator opening setting apparatus according to claim 13, wherein if the pedal-corresponding opening corresponding to the amount of operation of the accelerator pedal detected by the second detector is within a predetermined range of opening that is smaller than the predetermined opening, the controller sets the accelerator opening by adjusting the offset opening so that the offset opening corresponding to the vehicle speed decreases with increases in the pedal-corresponding opening.

15. The accelerator opening setting apparatus according to claim 8, further comprising:
a third detector that detects a steering angle, wherein the controller sets the accelerator opening by correcting the offset opening corresponding to the vehicle speed on a basis of the steering angle detected by the third detector.

16. The accelerator opening setting apparatus according to claim 15, wherein the controller sets the accelerator opening by correcting the offset opening with a tendency that the offset opening decreases with increases in the detected steering angle.

17. The accelerator opening setting apparatus according to claim 1, further comprising:
a third detector that detects a road surface slope, wherein the controller sets the accelerator opening based on the road surface slope detected by the third detector.

18. The accelerator opening setting apparatus according to claim 17, wherein the controller sets the accelerator opening with a tendency that the accelerator opening increases with increases in the road surface slope detected as an upward slope.

19. The accelerator opening setting apparatus according to claim 17, wherein the controller sets the accelerator opening so that the vehicle runs at a substantially fixed acceleration for a given amount of operation of the accelerator pedal, regardless of the road surface slope.

20. The accelerator opening setting apparatus according to claim 1, further comprising:
a third detector that detects a vehicle weight, wherein the controller sets the accelerator opening based on the vehicle weight detected by the third detector.

21. The accelerator opening setting apparatus according to claim 20, wherein the controller sets the accelerator opening with a tendency that the accelerator opening increases with increases in the detected vehicle weight.

22. The accelerator opening setting apparatus according to claim 20, wherein the controller sets the accelerator opening so that the vehicle runs at a substantially fixed acceleration for a given amount of operation of the accelerator pedal, regardless of the vehicle weight.

23. A motor vehicle comprising the accelerator opening setting apparatus according to claim 1, wherein the motor vehicle runs on a power corresponding to an accelerator opening set by the accelerator opening setting apparatus.

24. A motor vehicle equipped with the accelerator opening setting apparatus defined in claim 23, comprising:
an internal combustion engine;
an electric motor capable of inputting and outputting power to a drive shaft connected to a vehicle axle; and
a power transfer portion that transfers power from an output shaft of the internal combustion engine to the drive shaft with input or output of power based on an electrical energy, wherein the controller controls the internal combustion engine, the electric motor and the power transfer portion so that a power corresponding to the set accelerator opening is output to the drive shaft.

25. The motor vehicle equipped with the accelerator opening setting apparatus according to claim 24, wherein the power transfer portion has a pair-rotor electric motor which has a first rotor connected to the output shaft of the internal combustion engine, and a second rotor connected to the drive shaft and being rotatable relative to the first rotor, and which is able to input and output power based on the electrical energy on a basis of an electromagnetic effect of the first rotor and the second rotor.

26. The motor vehicle equipped with the accelerator opening setting apparatus according to claim 24, wherein the power transfer portion has a 3-shaft power input/output portion which is connected to three shafts, that is, the output shaft of the internal combustion engine, the drive shaft and a rotating shaft, which inputs or outputs a power corresponding to a power input or output with respect to two of the three shafts, with respect to another shaft of the three shaft, and also has a rotating shaft-purpose electric motor capable of inputting and outputting power with respect to the rotating shaft.

27. An accelerator opening setting apparatus of a motor vehicle for setting an accelerator opening in accordance with an amount of operation of an accelerator pedal, comprising:

a first detector that detects a vehicle speed;

a second detector that detects an operational state of the accelerator pedal; and a first storage that stores an offset opening corresponding to the vehicle speed; and a controller that sets an accelerator opening based on the operational state of the accelerator pedal detected by the second detector and the offset opening corresponding to the vehicle speed detected by the first detector among the offset openings in the first storage.

28. The accelerator opening setting apparatus according to claim 27, wherein the controller sets the accelerator opening at a sum of the offset opening and a pedal-corresponding opening corresponding to the amount of operation of the accelerator pedal detected by the second detector.

29. The accelerator opening setting apparatus according to claim 27, wherein the offset opening is set stepwise with respect to the vehicle speed.

30. The accelerator opening setting apparatus according to claim 29, wherein the offset opening is set with a hysteresis with respect to the vehicle speed.

31. A motor vehicle comprising an accelerator opening setting apparatus according to claim 27, wherein the motor vehicle runs on a power corresponding to a accelerator opening set by the accelerator opening setting apparatus.

32. The motor vehicle according to claim 31, comprising:

an internal combustion engine;

an electric motor capable of inputting and outputting power to a drive shaft connected to an axle; and a power transfer portion that transfers power from an output shaft of the internal combustion engine to the drive shaft with input or output of power based on an electrical energy, wherein the controller controls the internal combustion engine, the electric motor and the power transfer portion so that a power corresponding to the set accelerator opening is output to the drive shaft.

33. The motor vehicle according to claim 32, wherein the power transfer portion has a pair-rotor electric motor which has a first rotor connected to the output shaft of the internal combustion engine, and a second rotor connected to the drive shaft and being rotatable relative to the first rotor, and which is able to input and output power based on the electrical energy on a basis of an electromagnetic effect of the first rotor and the second rotor.

34. The motor vehicle according to claim 32, wherein the power transfer portion has a 3-shaft power input/output portion which is connected to three shafts, that is, the output shaft of the internal combustion engine, the drive shaft and a rotating shaft, which inputs or outputs a power corresponding to a power input or output with respect to two of the three shafts, with respect to another shaft of the three shaft, and also has a rotating shaft-purpose electric motor capable of inputting and outputting power with respect to the rotating shaft.

35. An accelerator opening setting method of a motor vehicle for setting an accelerator opening in accordance with an amount of operation of an accelerator pedal, comprising:

detecting a vehicle speed;

detecting an operational state of the accelerator pedal; and setting a cruise-purpose accelerator opening corresponding to the vehicle speed detected among stored predetermined cruise-purpose accelerator openings as an accelerator opening, if the amount of operation of the accelerator pedal detected equals a cruising operation amount corresponding to the detected vehicle speed among stored predetermined cruising operation amounts.

36. An accelerator opening setting method of a motor vehicle for setting an accelerator opening in accordance with an amount of operation of an accelerator pedal, comprising:

detecting a vehicle speed;

detecting an operational state of the accelerator pedal; and setting an accelerator opening based on the operational state of the accelerator pedal detected, and an offset opening corresponding to the vehicle speed detected among offset openings predetermined corresponding to the vehicle speed.

* * * * *